United States Patent
Katsumata et al.

(10) Patent No.: US 6,648,474 B2
(45) Date of Patent: Nov. 18, 2003

(54) PROJECTION APPARATUS

(75) Inventors: Masao Katsumata, Tokyo (JP); Hideki Yamamoto, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/232,301

(22) Filed: Aug. 30, 2002

(65) Prior Publication Data

US 2003/0058411 A1 Mar. 27, 2003

(30) Foreign Application Priority Data

Sep. 3, 2001 (JP) ........................ 2001-266280

(51) Int. Cl.[7] .............. G02F 1/00; G03B 21/00
(52) U.S. Cl. .............. 353/20; 348/750; 348/758; 349/9; 353/81; 359/634; 359/640
(58) Field of Search .............. 353/20, 31, 33, 353/34, 8, 81; 348/750, 751, 756, 758; 349/8, 9; 359/490, 493–497, 634, 638–640

*Primary Examiner*—Rodney Fuller
*Assistant Examiner*—Michael Dalakis

(74) *Attorney, Agent, or Firm*—Frommer Lawrence & Haug LLP; William S. Frommer

(57) ABSTRACT

A projection apparatus is disclosed which uses a light modulation element of the reflection type and can demultiplex and multiplex light appropriately. The projection apparatus includes four PBSs including an incoming PBS, a RB-PBS, a G-PBS and an outgoing PBS to demultiplex illumination light emitted from a lamp into light components in wavelength bands of blue, red and green. The illumination light in the wavelength band of green is introduced to a position at which the highest contrast is obtained, and a third liquid crystal panel is disposed at the position. The illumination light in the wavelength band of red is introduced to another position at which the second highest contrast is obtained, and a second liquid crystal panel is disposed at the position. The illumination light in the wavelength band of blue is introduced to the remaining position, and a first liquid crystal panel is disposed at the position. Reflected light components in the wavelength bands modulated by the individual liquid crystal panels are multiplexed and then projected in an enlarged scale through a projection lens.

17 Claims, 5 Drawing Sheets

PROJECTION APPARATUS

BACKGROUND OF THE INVENTION

This invention relates to a projection apparatus which uses an optical modulation element of the reflection type to modulate illumination light emitted from a light source and uses a lens to project the modulated illumination light as an image of an enlarged scale.

Conventionally, in order to make display on a large screen possible, a projection apparatus is used wherein illumination light from a lamp is irradiated on an optical modulation element such as a liquid crystal panel on which a pattern corresponding to an video signal inputted to the liquid crystal panel is displayed and reflected light from the liquid crystal panel is projected in an enlarged scale to project the pattern displayed on the liquid crystal panel in an enlarged scale.

Various optical systems for a projection apparatus wherein such a liquid crystal panel of the reflection type as described above is used have been proposed. An optical system for colors which uses a polarization rotating element having a function of rotating the polarization direction of light of a particular wavelength band by 90° and a polarization beam splitter (hereinafter referred to as PBS) is superior in both of the contrast and the brightness.

An exemplary one of projection apparatus in which such an optical system as just described is used is shown in FIG. 1. Referring to FIG. 1, the projector apparatus 100 shown includes a lamp 101 for irradiating illumination light and a fly's eye integrator 102, a PS conversion and multiplexing element 103, a main condenser 104, a field lens 105, a pre-polarizing plate 106, a G polarization rotating element 107 and an incoming PBS 108 disposed in order along a path of the light irradiated from the lamp 101.

In the projector apparatus 100 described above, illumination light emitted from the lamp 101 is uniformized by the fly's eye integrator 102 so as to have a uniform illuminance distribution. Then, P polarized light of the illumination light is converted into S polarized light by the PS conversion and multiplexing element 103 so that the illumination light thereafter includes only S polarized light. Then, the illumination light is condensed by the main condenser 104 and the field lens 105 and adjusted by the pre-polarizing plate 106 so that it has an adjusted polarization plane. Then, the polarization plane of the light in a wavelength band of green from within the illumination light of the arranged polarization plane is rotated by 90° by the G polarization rotating element 107 so that the light is converted into P polarized light. Then, the P polarized light, that is, the light in the wavelength band of green, passes through the incoming PBS 108 while the other S polarized light, that is, the light in wavelength bands of red and blue, is reflected by a reflecting surface 108a of the incoming PBS 108, which is inclined by 45° with respect to the light path, so that the advancing direction thereof is changed by 90°.

The projector apparatus 100 further includes a G-PBS 109 and a first liquid crystal panel 110 disposed in this order along the path of the illumination light which has passed through from the incoming PBS 108 and advanced straightforwardly.

The illumination light having passed through and advanced straightforwardly from the incoming PBS 108 is P polarized light in the wavelength band of green and therefore passes through the G-PBS 109 and is introduced to the first liquid crystal panel 110. The illumination light is modulated and reflected to the incoming direction by the first liquid crystal panel 110. The reflected light reflected by the first liquid crystal panel 110 is S polarized light in the wavelength band of green and is reflected by a reflecting surface 109a of the G-PBS 109, which is inclined by 45° with respect to the light path, so that the advancing direction thereof is changed by 90°.

The projector apparatus 100 further includes a R polarization rotating element 111 and a RB-PBS 112 disposed in this order in the direction of the path of the illumination light reflected by the reflecting surface 108a of the incoming PBS 108, a second liquid crystal panel 113 disposed in the advancing direction of the illumination light having passed through the RB-PBS 112, and a third liquid crystal panel 114 disposed in the advancing direction of the illumination light reflected by a reflecting surface 112a of the RB-PBS 112.

The illumination light reflected by the reflecting surface 108a of the incoming PBS 108 is S polarized light in the wavelength bands of red and blue, and the polarization plane of the light only in the wavelength band of red is rotated by 90° by the R polarization rotating element 111. The light of the rotated polarization plane enters the RB-PBS 112.

Of the illumination light entering the RB-PBS 112, the P polarized light in the wavelength band of red passes through the RB-PBS 112 and advances straightforwardly so that it is introduced to the second liquid crystal panel 113. Then, the P polarized light is modulated and reflected to the incoming direction by the second liquid crystal panel 113. On the other hand, of the illumination light entering the RB-PBS 112, the S polarized light in the wavelength band of blue is reflected by the reflecting surface 112a of the RB-PBS 112, which is inclined by 45° with respect to the light path, so that the advancing direction thereof is changed by 90°. Consequently, the S polarized light is introduced to the third liquid crystal panel 114 and is modulated and reflected to the incoming direction by the third liquid crystal panel 114.

The reflected light modulated and reflected by the second liquid crystal panel 113 is S polarized light in the wavelength band of red and is reflected by the reflecting surface 112a of the RB-PBS 112, which is inclined by 45° degrees with respect to the light path, so that the advancing direction of the S polarized light is changed by 90°. Meanwhile, the reflected light modulated and reflected by the third liquid crystal panel 114 is P polarized light in the wavelength band of blue, and passes through the third liquid crystal panel 114 and advances straightforwardly.

The projector apparatus 100 further includes a R polarization rotating element 115 disposed in the advancing direction of the reflected light from the second liquid crystal panel 113 reflected by the reflecting surface 112a of the RB-PBS 112 and the reflected light from the third liquid crystal panel 114 having passed through the RB-PBS 112.

The reflected light from the second liquid crystal panel 113 reflected by the reflecting surface 112a of the RB-PBS 112 is S polarized light in the wavelength band of red, and the polarization plane of the reflected light is rotated by 90° by the R polarization rotating element 115 so that the reflected light is converted into P polarized light. Meanwhile, the reflected light from the third liquid crystal panel 114 having passed through the RB-PBS 112 is P polarized light in the wavelength band of blue and passes through the R polarization rotating element 115.

The projector apparatus 100 further includes an outgoing PBS 116 disposed in the advancing direction of the reflected light from the first liquid crystal panel 110 reflected by the reflecting surface 109a of the G-PBS 109 and in the advancing directions of the reflected light from the second liquid crystal panel 113 having the polarization plane rotated by 90° by the R polarization rotating element 115 and the reflected light from the third liquid crystal panel 114 having passed through the R polarization rotating element 115.

The reflected light from the first liquid crystal panel 110 reflected by the reflecting surface 109a of the G-PBS 109 is S polarized light in the wavelength band of green and is reflected by a reflecting surface 116a of the outgoing PBS 116, which is inclined by 45° with respect to the light path, so that the advancing direction thereof is changed by 90°. Meanwhile, the reflected light from the second liquid crystal panel 113 having the polarization plane rotated by 90° by the R polarization rotating element 115 is P polarized light in the wavelength band of red and passes through the outgoing PBS 116 and advances straightforwardly. Further, the reflected light from the third liquid crystal panel 114 having passed through the R polarization rotating element 115 is P polarized light in the wavelength band of blue and therefore passes through the outgoing PBS 116 and advances straightforwardly.

The projector apparatus 100 further includes a G polarization rotating element 117, an outgoing polarizing plate 118 and a projection lens 119 disposed in this order along the light path in the advancing direction of the reflected light from the first liquid crystal panel 110 reflected by the reflecting surface 116a of the outgoing PBS 116, the reflected light from the second liquid crystal panel 113 having passed through the outgoing PBS 116 and the reflected light from the third liquid crystal panel 114.

The reflected light from the first liquid crystal panel 110 reflected by the reflecting surface 116a of the outgoing PBS 116 is S polarized light in the wavelength band of green and is converted into P polarized light by the G polarization rotating element 117 with the polarization plane thereof rotated by 90°. Then, the P polarized light is adjusted by the outgoing polarizing plate 118 so that it has an adjusted polarization plane and is then projected in an enlarged scale to a screen not shown by the projection lens 119. Meanwhile, the reflected light from the second liquid crystal panel 113 having passed through the outgoing PBS 116 is P polarized light in the wavelength band of red and passes through the G polarization rotating element 117, whereafter it is adjusted by the outgoing polarizing plate 118 so that it has an adjusted polarization plane and is then projected in an enlarged scale to the screen not shown by the projection lens 119. Further, the reflected light from the third liquid crystal panel 114 having passed through the outgoing PBS 116 is P polarized light in the wavelength band of blue and passes through the G polarization rotating element 117, whereafter it is adjusted by the outgoing polarizing plate 118 so that it has an adjusted polarization plane and is then projected in an enlarged scale to the screen not shown by the projection lens 119.

In this manner, the projector apparatus 100 projects a screen image corresponding to video signals inputted to the first, second and third liquid crystal panels 110, 113 and 114 for the three demultiplex colors of green, red and blue in an enlarged scale to the screen by the projection lens 119.

However, in such a projection apparatus which employs an optical system as described above, the contrast varies significantly depending upon at which places the three liquid crystal panels are disposed. This problem arises from a characteristic of a general PBS.

In particular, a general PBS makes use of interference of a thin film to cause demultiplexing and multiplexing of rays of light. Therefore, for example, the reflection factor of P polarized light which should pass through the PBSs is as high as approximately 10%. Consequently, when OFF light which is unnecessary light which should return to the lamp 101 without advancing to the projection lens 119 after it is reflected by the liquid crystal panels passes as P polarized light through each PBS, it is reflected by approximately 10% thereof by the PBS and comes to the projection lens 119, by which it is projected in an enlarged scale to the screen.

For example, in FIG. 1, the illumination light in the wavelength band of green is introduced as P polarized light to the first liquid crystal panel 110. Then, the reflected light from the first liquid crystal panel 110 includes modulated S polarized light and unnecessary P polarized light, and since the transmission factor of the G-PBS 109 for P polarized light cannot be 100%, approximately 10% of the unnecessary P polarized light, that is, the OFF light, is reflected together with the S polarized light by the G-PBS 109. The OFF light reflected by the G-PBS 109 in this manner comes to the outgoing PBS 116 and is reflected at approximately 10% thereof similarly by the outgoing PBS 116 as well. Then, the thus reflected OFF light comes to the projection lens 119 and is projected to the screen.

Such projection of OFF light which is unnecessary light deteriorates the contrast.

An actual contrast where the incoming PBS 108, G-PBS 109, RB-PBS 112 and outgoing PBS 116 have a transmission factor TP for P polarized light of 90%, a reflection factor RP for P polarized light of 10%, a transmission factor TS for S polarized light of 0.5% and a reflection factor RS for S polarized light of 99.5% is calculated below.

With regard to the wavelength band of green, while the illumination light is reflected by the first liquid crystal panel 110 and introduced to the projection lens 119, transmission of P polarized light through the incoming PBS 108, transmission of P polarized light through the G-PBS 109, reflection of S polarized light by the G-PBS 109 and reflection of S polarized light by the outgoing PBS 116 occur, and light to be projected to the screen from the projection lens 119, that is, light on the white side, decreases to TP×TP×RS×RS=80.2%. Meanwhile, while OFF light generated by the first liquid crystal panel 110 is introduced to the projection lens 119, reflection of P polarized light by the G-PBS 109 and reflection of P polarized light by the outgoing PBS 116 occur, and therefore, light which should not be projected to the screen from the projection lens 119, that is, light on the dark side, decreases to TP×TP×RP×RP=0.81%. Therefore, the contrast is approximately 99.

Meanwhile, with regard to the wavelength band of red, while the illumination light is reflected by the second liquid crystal panel 113 and introduced to the projection lens 119, light on the white side decreases to RS×TP×RS×TP=80.2%, and light on the dark side decreases to RS×TP×RP×TS=0.045%. Therefore, the contrast is approximately 1,780.

Further, with regard to the wavelength band of blue, while the illumination light is reflected by the third liquid crystal panel 114 and introduced to the projection lens 119, light on the white side decreases to RS×RS×TP×TP=80.2%, and light on the dark side decreases to RS×RS×TS×TS=0.0025%. Therefore, the contrast is approximately 32,000.

As described above, in the projector apparatus 100 described above which uses an optical system, the wavelength bands of blue, red and green have contrasts which decrease in this order, and the wavelength band of green which contributes most to the contrast of the screen image to be projected exhibits a state of the lowest contrast.

In order to compensate for the drawback described above, the projector apparatus 100 is configured such that the G polarization rotating element 117 is disposed adjacent the projection lens 119 with respect to the outgoing PBS 116 so that the polarization planes of rays of light in the wavelength bands of red, green and blue are adjusted to each other and the outgoing polarizing plate 118 is disposed next to the G polarization rotating element 117 to absorb and purify OFF light which deteriorates the contrasts of the light in the wavelength bands described above.

However, since the G polarization rotating element 117 and the outgoing polarizing plate 118 are additionally provided as described above, the number of devices involved in the optical system is greater as much, and this gives rise to a problem that the transmission efficiency is deteriorated, resulting in drop of the brightness of the screen image. Further, the G polarization rotating element 117 is a very expensive optical system, and employment of the G polarization rotating element 117 increases the cost of the entire projector apparatus.

SUMMARY OF THE INVENTION

It is an object of the present invention to provide a less expensive projection apparatus of a high performance which can project a screen image of an improved contrast at a minimized cost using a minimized number of expensive optical elements.

In order to attain the object described above, according to the present invention, there is provided a projection apparatus, comprising a light source for emitting illumination light, a condensing lens for condensing the illumination light emitted from the light source, a first polarizing plate for adjusting polarized light components of the illumination light having passed through the condensing lens, a first polarization rotating element for rotating the polarization plane of the illumination light in the wavelength band of green from within the illumination light whose polarized light components have been adjusted by the first polarizing plate, demultiplexing means for reflecting the illumination light in the wavelength band of green whose polarization plane has been rotated by the first polarization rotating element and passing the illumination light in wavelength bands of red and blue therethrough, a second polarization rotating element for rotating the polarization plane of the illumination light in a first one of the wavelength bands of red and blue from within the illumination light having passed through the demultiplexing means and passing the illumination light in a second one of the wavelength bands of red and blue therethrough, a first optical modulation element for modulating and reflecting the illumination light in the second wavelength band having passed through the second polarization rotating element, a second optical modulation element for modulating and reflecting the illumination light in the first wavelength band whose polarization plane has been rotated by the second polarization rotating element, a third optical modulation element for modulating and reflecting the illumination light in the wavelength band of green reflected by the demultiplexing means, a first polarization beam splitter interposed between the second polarization rotating element and the first and second optical modulation elements for passing the illumination light in the second wavelength band having passed through the second polarization rotating element so as to be introduced to the first optical modulation element and reflecting the illumination light in the first wavelength band whose polarization plane has been rotated by the second polarization rotating element so as to be introduced to the second optical modulation element and for reflecting the modulated and reflected light in the second wavelength band from the first optical modulation element and passing the modulated and reflected light in the first wavelength band from the second optical modulation element therethrough, a third polarization rotating element for passing the reflected light in the second wavelength band reflected by the first polarization beam splitter therethrough and rotating the polarization plane of the reflected light in the first wavelength band having passed through the first polarization beam splitter, a second polarization beam splitter interposed between the demultiplexing means and the third optical modulation element for reflecting the illumination light in the wavelength band of green reflected by the demultiplexing means so as to be introduced to the third optical modulation element and passing the modulated reflected light in the wavelength band of green from the third optical modulation element therethrough, a third polarization beam splitter for reflecting the reflected light in the second wavelength band having passed through the third polarization rotating element, reflecting the reflected light in the first wavelength band whose polarization plane has been rotated by the third polarization rotating element and passing the reflected light in the wavelength band of green having passed through the second polarization beam splitter therethrough, and a projection lens for projecting the reflected light in the first wavelength band reflected by the third polarization beam splitter, the reflected light in the second wavelength band reflected by the third polarization beam splitter and the reflected light in the wavelength band of green having passed through the third polarization beam splitter so as to form a screen image of an enlarged scale.

In the projection apparatus of reflection type according to the present invention, illumination light emitted from the light source is condensed by the condensing lens, and the polarization directions of the illumination light are adjusted by the first polarizing plate. Then, the polarization plane of the illumination light in the wavelength band of green is rotated by the first polarization rotating element, and then the illumination light is demultiplexed into the light component in the wavelength band of green and light components in the wavelength bands of red and blue by the demultiplexing means. Thereafter, the illumination light in a first one of the wavelength bands of red and blue is introduced to the first light modulation element by the second polarization rotating element and the second polarization beam splitter while the illumination light in a second one of the wavelength bands of red and blue is introduced to the second light modulation element. Then, reflected light in the first wavelength band modulated and reflected by the first light modulation element and reflection light in the second wavelength band modulated and reflected by the second light modulation element are introduced to the projection lens by the third polarization rotation element and the third polarization beam splitter so that they are projected in an enlarged scale by the projection lens. Meanwhile, the illumination light in the wavelength band of green is reflected by the second polarization beam splitter and introduced to the third light modulation element. Then, reflected light modulated and reflected by the third light modulation element passes through the second polarization beam splitter and the third polarization beam splitter and is projected in an enlarged scale by the projection lens. Where the third light modulation element for the wavelength band of green is disposed in this manner, the contrast of a screen image can be improved.

In particular, in the projection apparatus, the light modulation element for the wavelength band of green which influences most upon the contrast of the screen image is disposed at a position most advantageous for the contrast, that is, at a position at which the reflected light from the light modulation element for the wavelength band of green is not reflected by any polarization beam splitter until it comes to the projection lens. Consequently, otherwise possible mixture of OFF light into the reflected light from the light modulation element for the wavelength band of green can be prevented and therefore the contrast of the entire apparatus can be improved. Further, the specified optical design of the projection apparatus can reduce the number of expensive optical elements such as a polarization rotating element or a polarizing plate which are required in a conventional optical system. Therefore, the transmission factor is improved and the brightness of the entire apparatus is increased, and the cost can be reduced.

Preferably, the demultiplexing means is formed as a flat plate. This can reduce the cost and the weight of the overall apparatus.

Preferably, the first polarization beam splitter and the third polarization beam splitter are adhered to each other with the third polarization rotating element interposed therebetween, and the second polarization beam splitter and the third polarization beam splitter are adhered to each other. Where the beam splitters are adhered to each other with no air gap left therebetween in this manner so as to form a unitary member, miniaturization of the apparatus can be anticipated and reduction of the cost can be anticipated. Further, where the beam splitters are formed as a unitary member, otherwise possible pixel displacement between the light modulation elements can be suppressed.

The above and other objects, features and advantages of the present invention will become apparent from the following description and the appended claims, taken in conjunction with the accompanying drawings in which like parts or elements denoted by like reference symbols.

DESCRIPTION OF THE PREFERRED EMBODIMENTS

Figure 1:
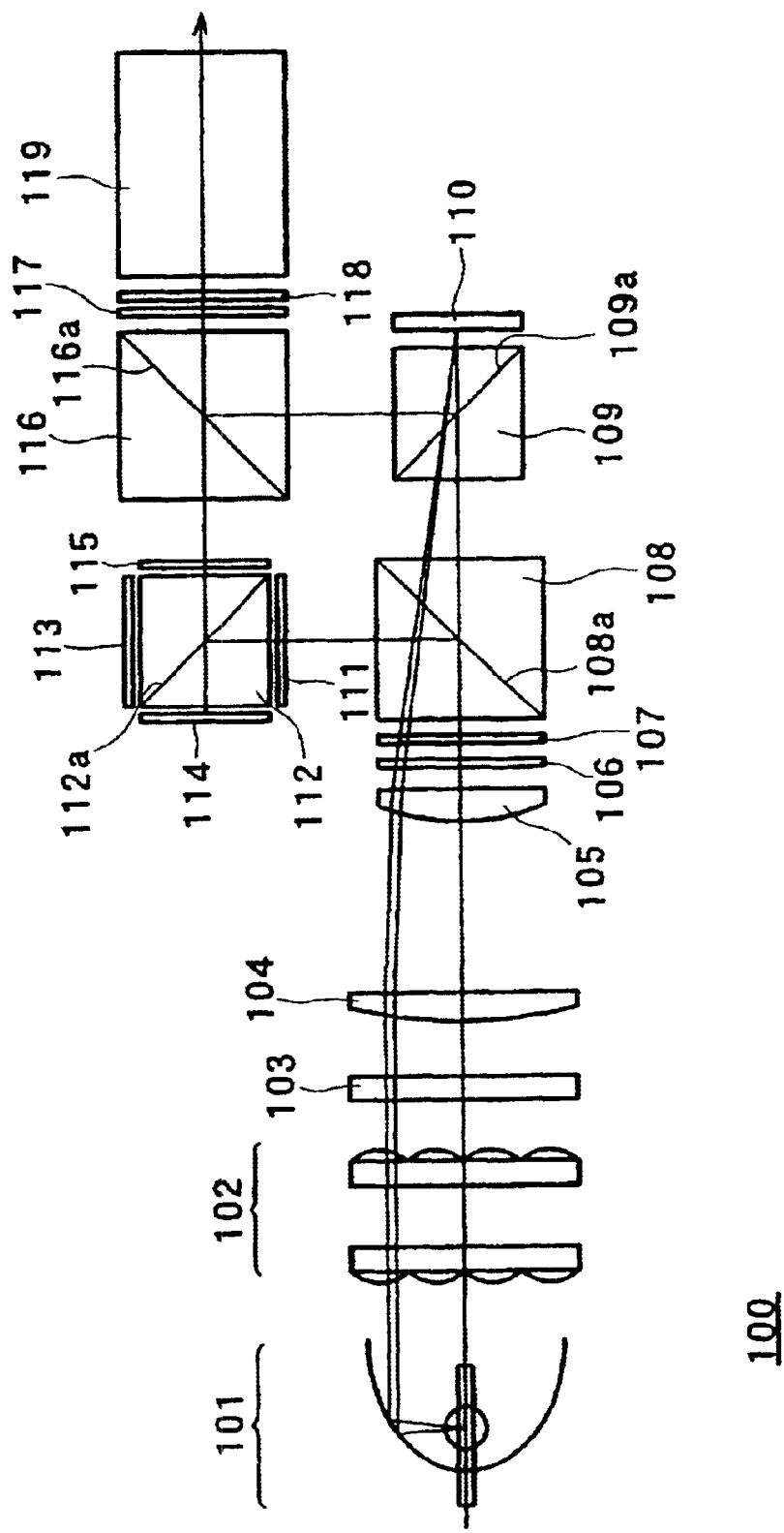
FIG. 1 is a schematic view showing a configuration of a conventional projector apparatus.
Figure 2:
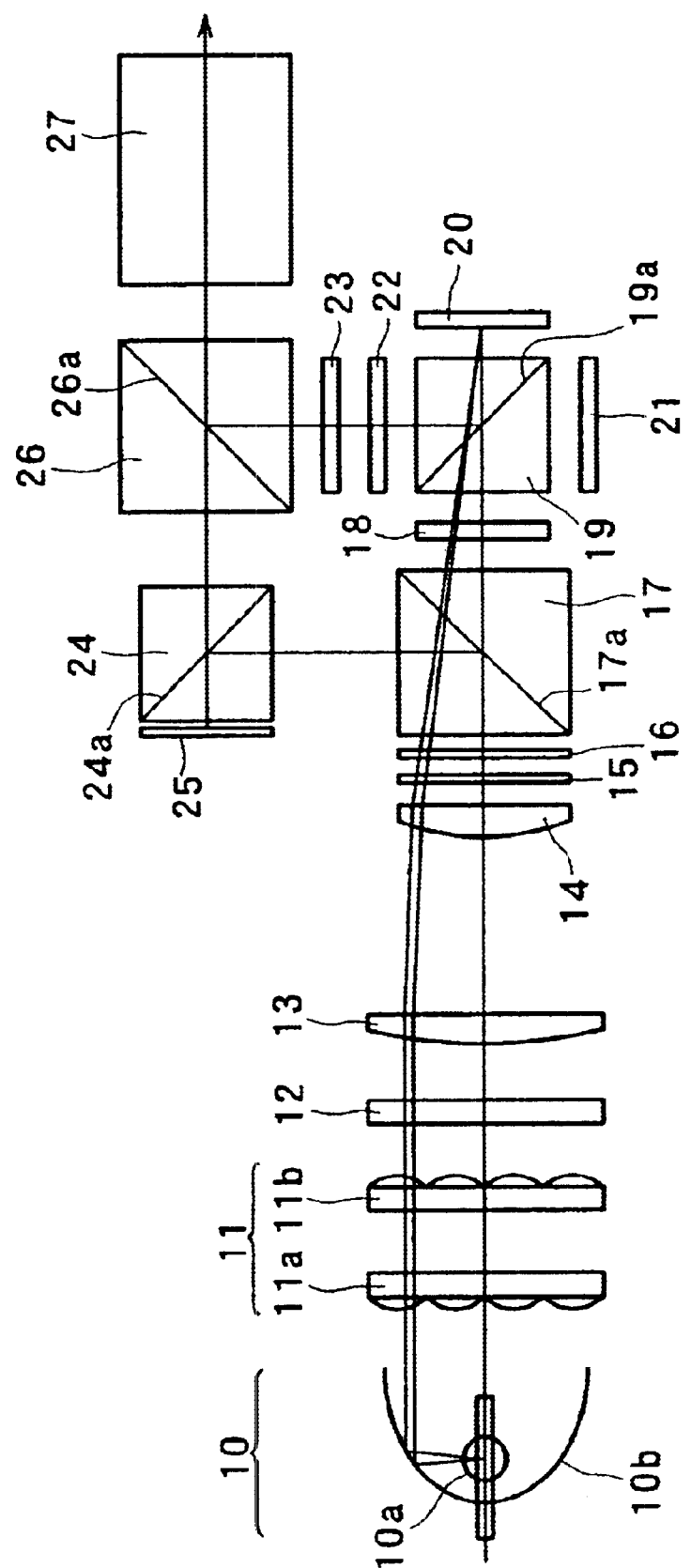
FIG. 2 is a schematic view showing a configuration of a projector apparatus to which the present invention is applied.

Referring to FIG. 2, there is shown a projection apparatus to which the present invention is applied. The projector apparatus 1 shown includes a lamp 10 serving as a light source for emitting illumination light, and a fly's eye integrator 11, a PS conversion and multiplexing element 12, a main condenser 13, a field lens 14, a pre-polarizing plate 15, a G polarization rotating element 16 and an incoming PBS 17 disposed in this order along a path of the light emitted from the lamp 10.

The lamp 10 can emit white light including light components in wavelength bands of red, green and blue which are the three primary colors of light required to display a color image. The lamp 10 includes a light emitting element 10a for emitting white light and a reflector 10b for reflecting the light emitted from the light emitting element 10a. The light emitting element 10a preferably is, for example, a high-pressure mercury-vapor lamp, a halogen lamp, a metal halide lamp or a xenon lamp. A concave mirror is used as the reflector 10b of the lamp 10 and preferably has a mirror surface having a high light condensing ratio such as, for example, a symmetrical surface of revolution such as a paraboloid of revolution or an ellipsoid of revolution.

The fly's eye integrator 11 converts illumination light emitted from the lamp 10 into a flux of light of a shape of an effective area of a liquid crystal panel hereinafter described to uniformize the illuminance distribution of the illumination light in order to uniformly illuminate the liquid crystal panel in the effective area. The fly's eye integrator 11 includes two multi-lens arrays 11a and 11b, on each of which a plurality of small convex lenses are disposed in an array, combined such that the illumination light from the lamp 10 is condensed by the multi-lens array 11a adjacent the lamp 10 to produce small point sources of light and then the illumination light from the small point sources of light is synthesized by the other multi-lens array 11b.

The PS conversion and multiplexing element 12 adjusts polarized light components of the illumination light from the lamp 10 in order to utilize the illumination light effectively. The PS conversion and multiplexing element 12 may be formed from a γ/2 plate, a polarization beam splitter or the like and can convert light, for example, from S polarized light into P polarized light. In particular, the PS conversion and multiplexing element 12 passes P polarized light from within the incoming illumination light therethrough but converts S polarized light from within the incoming illumination light into P polarized light and output it. Consequently, the PS conversion and multiplexing element 12 can convert the illumination light totally into P polarized light.

The main condenser 13 is a convex lens for condensing the illumination light having passed through the PS conversion and multiplexing element 12.

The field lens 14 is a convex lens for condensing the illumination light having passed through the main condenser 13.

The pre-polarizing plate 15 is a polarizing plate which passes therethrough a predetermined polarized light component of the illumination light having passed through the field lens 14 and passes, for example, a P polarized light component therethrough.

The G polarization rotating element 16 is a phase difference film of the lamination type optimized so as to rotate the polarization plane of a light component in the wavelength band of green, that is, a component of the light of green, from within the illumination light condensed by the field lens 14 by 90° but pass components of the other wavelength bands, that is, the wavelength bands of the components of red and green while maintaining the polarization conditions of them.

The incoming PBS 17 passes therethrough or reflects the illumination light having passed through the G polarization rotating element 16 in accordance with the polarized light components of the illumination light to demultiplex the polarized light components from each other. The incoming PBS 17 is configured such that, for example, members of quartz having a low double refraction characteristic or of glass such as SF57 of SCHOTT GLAS by Schott Corporation are adhered to each other with a multi-layer film of a dielectric material interposed therebetween. The incoming PBS 17 passes, for example, P polarized light therethrough but reflects S polarized light with a reflecting surface 17a, which is inclined by 45° with respect to the light path, to change the advancing direction of the P polarized light by 90°.

The incoming PBS 17 demultiplexes the illumination light having passed through the G polarization rotating element 16 into light which passes through the incoming PBS 17 and advances straightforwardly and light which is reflected by the reflecting surface 17a and changes the advancing direction thereof by 90°.

The projector apparatus 1 further includes a first R polarization rotating element 18 and a RB-PBS 19 disposed in this order on the path of the illumination light having passed through the incoming PBS 17 and advancing straightforwardly.

The first R polarization rotating element 18 is a phase difference film optimized so as to rotate the polarization plane of a component in a predetermined wavelength band from within the illumination light having passed through the incoming PBS 17, that is, the polarization plane of a component of a predetermined color, by 90° but pass components of the other wavelength bands therethrough while maintaining the polarization conditions of them. Since the green color component has already been reflected and demultiplexed by the incoming PBS 17, the first R polarization rotating element 18 rotates the polarization plane only of the illumination light of red from between the blue and red components having passed through the incoming PBS 17 by 90° while it passes therethrough the illumination light of the other wavelength band, that is, the illumination light of blue while maintaining the polarization plane of it.

The RB-PBS 19 passes therethrough or reflects the illumination light having passed through the first R polarization rotating element 18 in accordance with the polarized light components of illumination light to demultiplex the light components. The RB-PBS 19 is configured substantially similarly to the incoming PBS 17, and, for example, passes P polarized light therethrough so that it advances straightforwardly while it reflects S polarized light with a reflecting surface 19a thereof, which is inclined by 45° with respect to the light path, to change the advancing direction of the S polarized light by 90°.

The RB-PBS 19 demultiplexes the illumination light having passed through the first R polarization rotating element 18 and reflected light modulated by a liquid crystal panel hereinafter described into light having passed through the RB-PBS 19 and advancing straightforwardly and light reflected by the reflecting surface 19a and having an advancing direction changed by 90°.

The projector apparatus 1 further includes a first liquid crystal panel 20 disposed in the advancing direction of the illumination light having passed through the RB-PBS 19 and a second liquid crystal panel 21 disposed in the advancing direction of the illumination light reflected by the reflecting surface 19a of the RB-PBS 19.

The first liquid crystal panel 20 displays, when a video signal of blue from among video signals demultiplexed for the individual primary colors of light is inputted thereto, a pattern based on the video signal of blue, and modulates and reflects, when illumination light is inputted thereto, the illumination light. The first liquid crystal panel 20 is a liquid crystal panel in which liquid crystal molecules are encapsulated and can modulate light for each pixel.

The second liquid crystal panel 21 displays, when a video signal of red from among the video signals demultiplexed for the individual primary colors of light is inputted thereto, a pattern based on the video signal of red, and modulates and reflects, when the illumination light is inputted thereto, the illumination light. The second liquid crystal panel 21 is a liquid crystal panel in which liquid crystal molecules are encapsulated and can modulate light for each pixel.

The RB-PBS 19 reflects the reflected light modulated by the first liquid crystal panel 20 with the reflecting surface 19a thereof to change the advancing direction of it by 90° while it passes the reflected light modulated by the second liquid crystal panel 21 therethrough and advances straightforwardly.

The projector apparatus 1 further includes a second R polarization rotating element 22 and a B band polarizing plate 23 disposed in this order along the paths of the reflected light reflected by the reflecting surface 19a of the RB-PBS 19 and modulated by the first liquid crystal panel 20 and the reflected light having passed through the RB-PBS 19 and modulated by the second liquid crystal panel 21.

The second R polarization rotating element 22 is a phase difference film optimized to rotate the polarization plane of a component of a predetermined wavelength band, that is, a component of a predetermined color, from within the reflected light reflected by the reflecting surface 19a of the RB-PBS 19 and modulated by the first liquid crystal panel 20 and the reflected light having passed through the RB-PBS 19 and modulated by the second liquid crystal panel 21 by 90° and pass components of the other wavelength bands therethrough while maintaining the polarization conditions of them. The second R polarization rotating element 22 rotates, for example, the polarization plane only of the light component of red from between the components of blue and red having passed through the incoming PBS 17 by 90° because only the component of green has already been reflected and demultiplexed by the incoming PBS 17 while it passes the light component of the other wavelength band, that is, the light component of blue, therethrough while maintaining the polarization condition of it.

The B band polarizing plate 23 is a polarizing plate having a characteristic of absorbing a predetermined polarized light component from within the light in the wavelength band of blue. The B band polarizing plate 23 receives the reflected light having passed through the second R polarization rotating element 22 and modulated by the first liquid crystal panel 20 and the reflected light modulated by the second liquid crystal panel 21 and absorbs a predetermined polarized light component in the wavelength band of blue.

The projector apparatus 1 further includes a G-PBS 24 disposed in the advancing direction of the illumination light reflected by the reflecting surface 17a of the incoming PBS 17.

The G-PBS 24 passes therethrough or reflects the illumination light reflected by the reflecting surface 17a of the incoming PBS 17 to change the advancing direction by 90° in accordance with polarized light components of the illumination light. The G-PBS 24 has a configuration substantially similar to that of the incoming PBS 17. Accordingly, the G-PBS 24 passes, for example, P polarized light therethrough and reflects S polarized light with a reflecting surface 24a thereof, which is inclined by 45° with respect to the light path, to change the advancing direction of it by 90°.

The G-PBS 24 reflects the illumination light reflected by the reflecting surface 17a of the incoming PBS 17 with the reflecting surface 24a thereof to change the advancing direction of it by 90°.

The projector apparatus 1 further includes a third liquid crystal panel 25 disposed in the advancing direction of the illumination light reflected by the reflecting surface 24a of the G-PBS 24.

The third liquid crystal panel 25 displays, when a video signal of green from among the video signals demultiplexed for the primary colors of light is inputted thereto, a pattern based on the video signal of green and modulates and reflects, when the illumination light is introduced to the third liquid crystal panel 25, the illumination light. The third liquid crystal panel 25 is a display panel in which liquid crystal molecules are encapsulated and can modulate light for each pixel.

Further, the G-PBS 24 passes the reflected light modulated by the third liquid crystal panel 25 therethrough so that it advances straightforwardly.

The projector apparatus 1 further includes an outgoing PBS 26 disposed in the advancing direction of the reflected light modulated by the first liquid crystal panel 20 and having passed through the B band polarizing plate 23 and the reflected light modulated by the second liquid crystal panel 21 and in the advancing direction of the reflected light modulated by the third liquid crystal panel 25 and having passed through the G-PBS 24.

The outgoing PBS 26 passes or reflects the reflected light modulated by the first liquid crystal panel 20 and having passed through the B band polarizing plate 23, the reflected light modulated by the second liquid crystal panel 21 and the reflected light modulated by the third liquid crystal panel 25 and having passed through the G-PBS 24 in accordance with polarized light components to multiplex them. The outgoing PBS 26 has a configuration substantially similar to that of the incoming PBS 17. Thus, the outgoing PBS 26 passes, for example, P polarized light therethrough and reflects S polarized light with a reflecting surface 26a thereof, which is inclined by 45° with respect to the light path, to change the advancing direction of it by 90°.

The outgoing PBS 26 reflects the reflected light modulated by the first liquid crystal panel 20 and having passed through the B band polarizing plate 23 and the reflected light modulated by the second liquid crystal panel 21 with the reflecting surface 26a thereof to change the advancing directions of them by 90° and passes therethrough the reflected light modulated by the third liquid crystal panel 25 and having passed through the GP-BS 24 so as to advance straightforwardly, and outputs them in the same direction.

The projector apparatus 1 further includes a projection lens 27 disposed in the advancing direction of the reflected light modulated by the first liquid crystal panel 20 and reflected by the reflecting surface 26a of the outgoing PBS 26, the reflected light modulated by the second liquid crystal panel 21 and reflected by the reflecting surface 26a of the outgoing PBS 26, and the reflecting light modulated by the third liquid crystal panel 25 and having passed through the outgoing PBS 26.

The projection lens 27 is a convex lens which can project all of the reflected light modulated by the first liquid crystal panel 20 and reflected by the reflecting surface 26a of the outgoing PBS 26, the reflected light modulated by the second liquid crystal panel 21 and reflected by the reflecting surface 26a of the outgoing PBS 26, and the reflecting light modulated by the third liquid crystal panel 25 and having passed through the outgoing PBS 26 in an enlarged scale. Thus, the projection lens 27 can project a screen image to a screen or the like not shown.

Operation of the projector apparatus 1 having the configuration described above is described in connection with the components of it disposed along the light path of the illumination light emitted from the lamp 10.

The illumination light emitted from the lamp 10 includes light components of the wavelength bands of red, green and blue of the primary colors of light and is introduced as non-polarized light to the fly's eye integrator 11.

The illumination light introduced to the fly's eye integrator 11 passes through the fly's eye integrator 11, whereupon the illuminance distribution thereof is uniformized by the fly's eye integrator 11. Then, the illumination light is inputted to the PS conversion and multiplexing element 12.

Of the illumination light inputted to the PS conversion and multiplexing element 12, P polarized light passes as it is through the PS conversion and multiplexing element 12 while S polarized light is converted into P polarized light by the PS conversion and multiplexing element 12. Consequently, the illumination light is inputted all as P polarized light to the main condenser 13.

The illumination light inputted to the main condenser 13 is condensed by the main condenser 13 and introduced to the field lens 14, by which it is condensed. Thereafter, the illumination light is inputted to the pre-polarizing plate 15.

The pre-polarizing plate 15 adjusts the polarized light components of the illumination light inputted thereto and introduces the resulting light as P polarized light to the G polarization rotating element 16.

Then, the light component only in the wavelength band of green from within the illumination light inputted to the G polarization rotating element 16 is converted into S polarized light with the polarization plane thereof rotated by 90° by the G polarization rotating element 16 and is introduced to the incoming PBS 17. Meanwhile, the light components of red and blue pass through the G polarization rotating element 16 while they remain S polarized light, and are then introduced to the incoming PBS 17.

The illumination light introduced to the incoming PBS 17 includes S polarized light in the wavelength band of green and P polarized light in the wavelength bands of red and blue, and only the P polarized light passes through the reflecting surface 17a of the incoming PBS 17 and advances straightforwardly while the S polarized light is reflected by the reflecting surface 17a and changes its advancing direction by 90°. In other words, the illumination light in the wavelength bands of red and blue advances straightforwardly within and through the incoming PBS 17 and is introduced to the first R polarization rotating element 18 while the illumination light in the wavelength band of green is reflected by the reflecting surface 17a of the incoming PBS 17 and changes its advancing direction by 90° so that it is introduced to the G-PBS 24.

Here, description is given of the light paths of the illumination light in the wavelength bands of red and blue having passed through the incoming PBS 17 and introduced to the first R polarization rotating element 18 from within the illumination light demultiplexed by the incoming PBS 17 described above.

The illumination light introduced to the first R polarization rotating element 18 includes P polarized light in the wavelength bands of red and blue, and the illumination light in the wavelength band of red is converted into S polarized light with the polarization plane thereof rotated by 90° by the first R polarization rotating element 18 and is introduced to the RB-PBS 19.

The illumination light introduced to the RB-PBS 19 includes S polarized light in the wavelength band of red and P polarized light in the wavelength band of blue, and the P polarized light in the wavelength band of blue passes through the reflecting surface 19a of the RB-PBS 19 and is introduced to the first liquid crystal panel 20. Meanwhile, the S polarized light in the wavelength band of red is reflected by the reflecting surface 19a of the RB-PBS 19 and changes its advancing direction by 90° so that it is introduced to the second liquid crystal panel 21.

Further, the illumination light introduced to the first liquid crystal panel 20 is P polarized light in the wavelength band of blue and is modulated and reflected by the first liquid crystal panel 20, on which a pattern based on a video signal of blue is displayed, so that the advancing direction thereof is changed by 180°. Upon such reflection, S polarized light is produced and returned to the RB-PBS 19.

Furthermore, the illumination light introduced to the second liquid crystal panel 21 is S polarized light in the wavelength band of red and is modulated and reflected by the second liquid crystal panel 21, on which a pattern based on a video signal of red is displayed, so that the advancing direction thereof is changed by 180°. Upon such reflection, P polarized light is produced and returned to the RB-PBS 19.

The reflected light from the first liquid crystal panel 20 returned to the RB-PBS 19 includes S polarized light in the wavelength band of blue and P polarized light which is OFF light, and the P polarized light passes through the reflecting surface 19a of the RB-PBS 19 and is returned to the lamp 10 side while the S polarized light is reflected by the reflecting surface 19a to change the advancing direction by 90° and introduced to the second R polarization rotating element 22. Meanwhile, the reflected light from the second liquid crystal panel 21 returned to the RB-PBS 19 includes P polarized light in the wavelength band of red and S polarized light which is OFF light, and the S polarized light is reflected by the reflecting surface 19a of the RB-PBS 19 and returned to the lamp 10 side while the P polarized light passes through the reflecting surface 19a of the RB-PBS 19 and is introduced to the second R polarization rotating element 22.

The reflected light from the first liquid crystal panel 20 introduced to the second R polarization rotating element 22 is S polarized light in the wavelength band of blue and passes through the second R polarization rotating element 22 so that it is introduced to the B band polarizing plate 23. Meanwhile, the reflected light from the second liquid crystal panel 21 introduced to the second R polarization rotating element 22 is P polarized light in the wavelength band of red and is converted into S polarized light with the polarization plane thereof rotated by 90° by the second R polarization rotating element 22. The resulting S polarized light is introduced to the B band polarizing plate 23.

The reflected light from the first liquid crystal panel 20 introduced to the B band polarizing plate 23 is S polarized light in the wavelength band of blue, and the OFF light having been reflected by a small amount by the reflecting surface 19a of the RB-PBS 19, that is, P polarized light, is absorbed by the B band polarizing plate 23 while only the S polarized light passes through the B band polarizing plate 23 and is introduced to the outgoing PBS 26. Meanwhile, the reflected light from the second liquid crystal panel 21 introduced to the B band polarizing plate 23 is S polarized light in the wavelength band of red and passes as it is through the B band polarizing plate 23 so that it is introduced to the outgoing PBS 26.

The reflected light from the first liquid crystal panel 20 introduced to the outgoing PBS 26 is S polarized light in the wavelength band of blue and is reflected by the reflecting surface 26a of the outgoing PBS 26 to change the advancing direction thereof by 90° so that it is introduced to the projection lens 27.

Now, description is given of the light path of the illumination light in the wavelength band of green reflected by the reflecting surface 17a of the incoming PBS 17 and introduced to the G-PBS 24 from within the illumination light demultiplexed by the incoming PBS 17 described above.

The illumination light introduced to the G-PBS 24 is S polarized light in the wavelength band of green and is reflected by the reflecting surface 24a of the G-PBS 24 to change the advancing direction thereof by 90° so that it is introduced to the third liquid crystal panel 25.

The illumination light introduced to the third liquid crystal panel 25 is S polarized light in the wavelength band of green and is modulated and reflected by the third liquid crystal panel 25, on which a pattern based on a video signal of green is displayed, to change the advancing direction thereof by 180°. Upon such reflection, P polarized light is produced and returned to the G-PBS 24.

The reflected light from the third liquid crystal panel 25 returned to the G-PBS 24 includes P polarized light in the wavelength band of green and S polarized light which is OFF light, and the S polarized light is reflected by the reflecting surface 24a to change the advancing direction thereof by 90° so that it is returned to the incoming PBS 17 while the P polarized light passes through the reflecting surface 24a and is introduced to the outgoing PBS 26.

The reflected light from the third liquid crystal panel 25 introduced to the outgoing PBS 26 is P polarized light in the wavelength band of green and passes through the reflecting surface 26a of the outgoing PBS 26 and then advances straightforwardly so that it is introduced to the projection lens 27.

As described above, the light components in the wavelength bands demultiplexed into the three light paths by the incoming PBS 17 and the RB-PBS 19 are inputted as illumination light to the liquid crystal panels corresponding to the respective wavelength bands and modulated and reflected by the respective liquid crystal panels. The reflected light components modulated by the respective liquid crystal panels are multiplexed by the outgoing PBS 26 and introduced to the projection lens 27, by which they are projected in an enlarged scale to the screen or the like.

In the projector apparatus 1 having such a configuration as described above, since the third liquid crystal panel 25 to which a video signal of green is inputted is disposed at a position at which improvement in contrast can be anticipated most, that is, at a position at which reflected light modulated by the third liquid crystal panel 25 is not reflected by any PBS and does not change its advancing direction between the third liquid crystal panel 25 and the projection lens 27 on the light path of the reflected light and illumination light in the wavelength band of green is introduced to the third liquid crystal panel 25, OFF light is suppressed from being reflected and introduced to the projection lens 27. Consequently, the contrast of the entire projector apparatus 1 is improved.

Further, in the projector apparatus 1, the second liquid crystal panel 21 corresponding to the wavelength band of red is disposed at a position at which improvement in contrast can be anticipated second most. Since light in the wavelength band of red is weakest, the second liquid crystal panel 21 is disposed preferentially to the first liquid crystal panel 20 corresponding to the wavelength band of blue so that the balance among the colors may be maintained.

In this manner, in the projector apparatus 1, since the third liquid crystal panel 25 corresponding to the wavelength band of green which influences most upon the contrast of the screen image is disposed at a position most advantageous for the contrast, the contrast of the entire system is improved. Further, since the amount of light in the wavelength band of blue from between the remaining wavelength bands of red and blue is greater in the characteristic of the light source, the second liquid crystal panel 21 corresponding to the wavelength band of red is disposed at the second most advantageous position while the first liquid crystal panel 20 corresponding to the wavelength band of blue is disposed next to the second liquid crystal panel 21 corresponding to the wavelength band of red. Therefore, the amount of light in the wavelength band of red can be maintained.

Further, in the projector apparatus 1, since the B band polarizing plate 23 is disposed, OFF light which has been reflected by the reflecting surface 19a of the RB-PBS 19 from within the reflected light from the first liquid crystal panel 20 disposed at the position least advantageous for the contrast can be cut. It is to be noted that, although the B band polarizing plate 23 has an influence also on the wavelength band of green in the polarization characteristic of the polarizing plate, since light in the wavelength band of green is not introduced to the position of the B band polarizing plate 23 but only light components in the wavelength bands of blue and red are introduced to the position of the B band polarizing plate 23, there is no necessity to take such influence upon a different wavelength band into consideration.

As described above, the projector apparatus 1 achieves improvement in contrast of light in the wavelength bands of green and red and achieves improvement in contrast of light also in the wavelength band of blue using a B band polarizing plate, and therefore can project a clear screen image. Further, since the projector apparatus 1 reduces the number of expensive elements such as a G rotating polarizing element or an outgoing polarizing plate used therein when compared with conventional projector apparatus, not only the transmission efficiency is improved, but also reduction of the cost can be anticipated.

Figure 3:
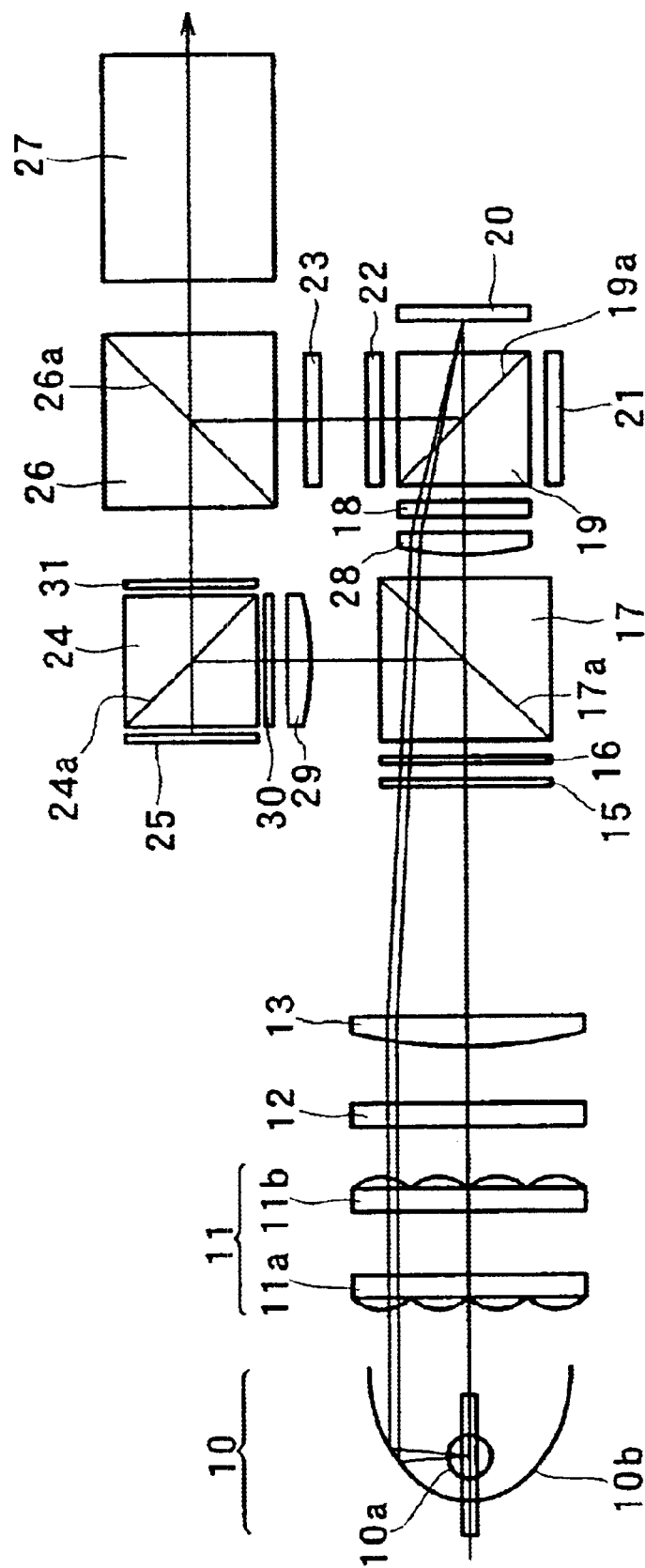
FIG. 3 is a schematic view showing a configuration of another projector apparatus to which the present invention is applied and wherein two field lenses are used.

Referring now to FIG. 3, there is shown another projector apparatus to which the present invention is applied. The projector apparatus shown is generally denoted by 40 and includes several common components to those of the projector apparatus 1 described hereinabove with reference to FIG. 2, and detailed overlapping description of the common components is omitted herein to avoid redundancy.

The projector apparatus 40 includes a lamp 10 serving as a light source for emitting illumination light, and a fly's eye integrator 11, a PS conversion and multiplexing element 12, a main condenser 13, a pre-polarizing plate 15, a G polarization rotating element 16 and an incoming PBS 17 disposed along a path of light emitted from the lamp 10.

The incoming PBS 17 demultiplexes the illumination light having passed through the G polarization rotating element 16 into light which passes through the incoming PBS 17 and advances straightforwardly and light which is reflected by the reflecting surface 17a to change the advancing direction thereof by 90°.

The projector apparatus 40 further includes a first field lens 28, a first R polarization rotating element 18, and an RB-PBS 19 disposed in this order along a path of the illumination light having passed through the incoming PBS 17 and advanced straightforwardly.

The first field lens 28 is a convex lens for condensing the illumination light having passed through the incoming PBS 17 on the first liquid crystal panel 20 and the second liquid crystal panel 21.

The first R polarization rotating element 18 is a phase difference film optimized to rotate the polarization plane of a component in a predetermined wavelength band, that is, a component of a predetermined color, from within the illumination light having passed through the first field lens 28 by 90° and pass the other components in the other wavelength bands therethrough while maintaining the polarization condition of them.

The RB-PBS 19 demultiplexes the illumination light having passed through the first R polarization rotating element 18 and reflected light modulated by the liquid crystal panels 20 and 21 hereinafter described into light which passes through the RB-PBS 19 and advances straightforwardly and light which is reflected by the reflecting surface 19a and changes the advancing direction thereof by 90°.

The projector apparatus 40 further includes a first liquid crystal panel 20 disposed in the advancing direction of the illumination light having passed through the RB-PBS 19 and a second liquid crystal panel 21 disposed in the advancing direction of the illumination light reflected by the reflecting surface 19a of the RB-PBS 19.

The RB-PBS 19 reflects the reflected light modulated by the first liquid crystal panel 20 with a reflecting surface 19a thereof to change the advancing direction of it by 90° while it passes the reflected light modulated by the second liquid crystal panel 21 therethrough so as to advance straightforwardly.

The projector apparatus 40 further includes a second R polarization rotating element 22 and a B band polarizing plate 23 disposed in this order in the advancing direction of the reflected light modulated by the first liquid crystal panel 20 and reflected by the reflecting surface 19a of the RB-PBS 19 and the reflected light modulated by the second liquid crystal panel 21 and having passed through the RB-PBS 19.

The projector apparatus 40 further includes a second field lens 29, a first G trimmer 30 and a G-PBS 24 disposed in this order along a path of the illumination light reflected by the reflecting surface 17a of the PBS 17.

The second field lens 29 is a condensing lens for condensing the illumination light reflected by the reflecting surface 17a of the incoming PBS 17 on a third liquid crystal panel 25.

The first G trimmer 30 is a trimming filter having a characteristic adjusted so that only light in the wavelength band of green from within the illumination light having passed through the second field lens 29 may pass therethrough.

The G-PBS 24 transmits or reflects the illumination light having passed through the first G trimmer 30 in accordance with a polarized light component of it.

The G-PBS 24 reflects the illumination light having passed through the first G trimmer 30 with a reflecting surface 24a thereof to change the advancing direction of it by 90°.

The projector apparatus 40 further includes a third liquid crystal panel 25 disposed in the advancing direction of the illumination light reflected by the reflecting surface 24a of the G-PBS 24.

The G-PBS 24 passes reflected light modulated by the third liquid crystal panel 25 therethrough so as to advance straightforwardly.

The projector apparatus 40 further includes a second G trimmer 31 disposed in the advancing direction of the reflected light modulated by the third liquid crystal panel 25 and having passed through the G-PBS 24.

The second G trimmer 31 is a trimming filter having a characteristic adjusted so as to pass therethrough light in the wavelength band of green from within the reflected light modulated by the third liquid crystal panel 25 and having passed through the G-PBS 24.

The projector apparatus 40 further includes an outgoing PBS 26 disposed in the advancing direction of the reflected light modulated by the first liquid crystal panel 20 and having passed through the B band polarizing plate 23 and the reflected light modulated by the second liquid crystal panel 21 and in the advancing direction of the reflected light modulated by the third liquid crystal panel 25 and having passed through the second G trimmer 31.

The outgoing PBS 26 passes or reflects the reflected light modulated by the first liquid crystal panel 20 and having passed through the B band polarizing plate 23, the reflected light modulated by the second liquid crystal panel 21 and the reflected light modulated by the third liquid crystal panel 25 and having passed through the second G trimmer 31 to multiplex them in accordance with the polarized light components of them. The outgoing PBS 26 has a configuration substantially similar to that of the incoming PBS 17, and, for example, passes P polarized light therethrough but reflects S polarized light with a reflecting surface 26a thereof, which is inclined by 45° with respect to the light path, to change the advancing direction of it by 90°.

The outgoing PBS 26 reflects the reflected light modulated by the first liquid crystal panel 20 and having passed through the B band polarizing plate 23 and the reflected light modulated by the second liquid crystal panel 21 with the reflecting surface 26a thereof to change the advancing direction of them by 90° while it passes therethrough the reflected light modulated by the third liquid crystal panel 25 and having passed through the second G trimmer 31 such that it advances straightforwardly so that they may be outputted in the same direction.

The projector apparatus 40 further includes a projection lens 27 disposed in the advancing direction of the reflected light modulated by the first liquid crystal panel 20 and reflected by the reflecting surface 26a of the outgoing PBS 26, the reflected light modulated by the second liquid crystal panel 21 and reflected by the reflecting surface 26a of the outgoing PBS 26, and the reflected light modulated by the third liquid crystal panel 25 and having passed through the outgoing PBS 26.

Operation of the projector apparatus 40 having the configuration described above is described in connection with the components of it disposed along the light path of the illumination light emitted from the lamp 10.

The illumination light emitted from the lamp 10 includes light components of the wavelength bands of red, green and blue of the primary colors of light and is introduced as non-polarized light to the fly's eye integrator 11.

The illumination light introduced to the fly's eye integrator 11 passes through the fly's eye integrator 11, whereupon the illuminance distribution thereof is uniformized by the fly's eye integrator 11. Then, the illumination light is inputted to the PS conversion and multiplexing element 12.

Of the illumination light inputted to the PS conversion and multiplexing element 12, P polarized light passes as it is through the PS conversion and multiplexing element 12 while S polarized light is converted into P polarized light by the PS conversion and multiplexing element 12. Consequently, the illumination light is inputted all as P polarized light to the main condenser 13.

The illumination light inputted to the main condenser 13 is condensed by the main condenser 13 and inputted to the pre-polarizing plate 15.

The pre-polarizing plate 15 adjusts the polarized light components of the illumination light inputted thereto and introduces the resulting light as P polarized light to the G polarization rotating element 16.

Then, the light component only in the wavelength band of green from within the illumination light inputted to the G polarization rotating element 16 is converted into S polarized light with the polarization plane thereof rotated by 90° by the G polarization rotating element 16 and passes through the G polarization rotating element 16 so that it is introduced to the incoming PBS 17. Meanwhile, the light components of red and blue pass through the G polarization rotating element 16 while they remain P polarized light, and are then introduced to the incoming PBS 17.

The illumination light introduced to the incoming PBS 17 includes S polarized light in the wavelength band of green and P polarized light in the wavelength bands of red and blue, and only the P polarized light passes through the reflecting surface 17a of the incoming PBS 17 and advances straightforwardly while the S polarized light is reflected by the reflecting surface 17a and changes its advancing direction by 90°. In other words, the illumination light in the wavelength bands of red and blue advances straightforwardly within and through the incoming PBS 17 and is introduced to the first field lens 28 while the illumination light in the wavelength band of green is reflected by the reflecting surface 17a of the incoming PBS 17 and changes its advancing direction by 90° so that it is introduced to the second field lens 29.

Here, description is given of the light paths of the illumination light in the wavelength bands of red and blue having passed through the incoming PBS 17 and introduced to the first field lens 28 from within the illumination light demultiplexed by the incoming PBS 17 described above.

The illumination light introduced to the first field lens 28 is P polarized light in the wavelength bands of red and blue and is introduced to the first R polarization rotating element 18 so that it may be condensed on the first liquid crystal panel 20 and the second liquid crystal panel 21.

The illumination light introduced to the first R polarization rotating element 18 is P polarized light in the wavelength bands of red and blue, and the illumination light in the wavelength band of red is converted into S polarized light with the polarization plane thereof rotated by 90° by the first R polarization rotating element 18 and is introduced to the RB-PBS 19.

The illumination light introduced to the RB-PBS 19 includes S polarized light in the wavelength band of red and P polarized light in the wavelength band of blue, and the P polarized light in the wavelength band of blue passes through the reflecting surface 19a of the RB-PBS 19 and is introduced to the first liquid crystal panel 20. Meanwhile, the S polarized light in the wavelength band of red is reflected by the reflecting surface 19a of the RB-PBS 19 and changes its advancing direction by 90° so that it is introduced to the second liquid crystal panel 21.

The illumination light introduced to the first liquid crystal panel 20 is P polarized light in the wavelength band of blue and is modulated and reflected by the first liquid crystal panel 20, on which a pattern based on a video signal of blue is displayed, so that the advancing direction thereof is changed by 180°. Upon such reflection, S polarized light is produced and returned to the RB-PBS 19.

Meanwhile, the illumination light introduced to the second liquid crystal panel 21 is S polarized light in the wavelength band of red and is modulated and reflected by the second liquid crystal panel 21, on which a pattern based on a video signal of red is displayed, so that the advancing direction thereof is changed by 180°. Upon such reflection, P polarized light is produced and returned to the RB-PBS 19.

The reflected light from the first liquid crystal panel 20 returned to the RB-PBS 19 includes S polarized light in the wavelength band of blue and P polarized light which is OFF light, and the P polarized light passes through the reflecting surface 19a of the RB-PBS 19 and is returned to the lamp 10 side while the S polarized light is reflected by the reflecting surface 19a to change the advancing direction by 90° and introduced to the second R polarization rotating element 22. Meanwhile, the reflected light from the second liquid crystal panel 21 returned to the RB-PBS 19 includes P polarized light in the wavelength band of red and S polarized light which is OFF light, and the S polarized light is reflected by the reflecting surface 19a of the RB-PBS 19 and returned to the lamp 10 side while the P polarized light passes through the reflecting surface 19a of the RB-PBS 19 and is introduced to the second R polarization rotating element 22.

The reflected light from the first liquid crystal panel 20 introduced to the second R polarization rotating element 22 is S polarized light in the wavelength band of blue and passes through the second R polarization rotating element 22 so that it is introduced to the B band polarizing plate 23. Meanwhile, the reflected light from the second liquid crystal panel 21 introduced to the second R polarization rotating element 22 is P polarized light in the wavelength band of red and is converted into S polarized light with the polarization plane thereof rotated by 90° by the second R polarization rotating element 22. The resulting S polarized light is introduced to the B band polarizing plate 23.

The reflected light from the first liquid crystal panel 20 introduced to the B band polarizing plate 23 is S polarized light in the wavelength band of blue, and the OFF light having been reflected by a very small amount by the reflecting surface 19a of the RB-PBS 19, that is, P polarized light, is absorbed by the B band polarizing plate 23 while only the S polarized light passes through the B band polarizing plate 23 and is introduced to the outgoing PBS 26. Meanwhile, the reflected light from the second liquid crystal panel 21 introduced to the B band polarizing plate 23 is S polarized light in the wavelength band of red and passes as it is through the B band polarizing plate 23 so that it is introduced to the outgoing PBS 26.

The reflected light from the first liquid crystal panel 20 introduced to the outgoing PBS 26 is S polarized light in the wavelength band of blue and is reflected by the reflecting surface 26a of the outgoing PBS 26 to change the advancing direction thereof by 90° so that it is introduced to the projection lens 27.

Now, description is given of the light path of illumination light in the wavelength band of green reflected by the reflecting surface 17a of the incoming PBS 17 and introduced to the second field lens 29 from within the illumination light demultiplexed by the incoming PBS 17 described above.

The illumination light introduced to the second field lens 29 is S polarized light in the wavelength band of green and is introduced to the first G trimmer 30 so that it may be condensed on the third liquid crystal panel 25.

The illumination light introduced to the first G trimmer 30 is S polarized light in the wavelength band of green and is trimmed by the first G trimmer 30 such that only the light in the wavelength band of green passes through the first G trimmer 30 while the light in the unnecessary wavelength band having been reflected by a very small amount by the reflecting surface 17a of the incoming PBS 17 is intercepted by the first G trimmer 30. Then, the resulting illumination light is introduced to the G-PBS 24.

The illumination light introduced to the G-PBS 24 is S polarized light in the wavelength band of green and is reflected by the reflecting surface 24a of the G-PBS 24 to change the advancing direction thereof by 90° so that it is introduced to the third liquid crystal panel 25.

The illumination light introduced to the third liquid crystal panel 25 is S polarized light in the wavelength band of green and is modulated and reflected by the third liquid crystal panel 25, on which a pattern based on a video signal of green is displayed, so that the advancing direction thereof is changed by 180°. Upon such reflection, P polarized light is produced and returned to the G-PBS 24.

The reflected light from the third liquid crystal panel 25 returned to the G-PBS 24 includes P polarized light in the wavelength band of green and S polarized light which is OFF light, and the S polarized light is reflected by the reflecting surface 24a to change the advancing direction thereof by 90° so that it is returned to the incoming PBS 17 while the P polarized light passes through the reflecting surface 24a and is introduced to the second G trimmer 31.

The reflected light from the third liquid crystal panel 25 introduced to the second G trimmer 31 is P polarized light in the wavelength band of green and is trimmed by the second G trimmer 31 such that only the light in the wavelength band of green passes through the second G trimmer 31 while the light in the unnecessary wavelength band having been reflected by a very small amount by the reflecting surface 17a of the incoming PBS 17 is intercepted by the second G trimmer 31. Then, the resulting illumination light is introduced to the outgoing PBS 26.

The reflected light from the third liquid crystal panel 25 introduced to the outgoing PBS 26 is P polarized light in the wavelength band of green and passes through the reflecting surface 26a of the outgoing PBS 26 and then advances straightforwardly so that it is introduced to the projection lens 27.

As described above, the light components in the wavelength bands demultiplexed into the three light paths by the incoming PBS 17 and the RB-PBS 19 are inputted as illumination light to the liquid crystal panels corresponding to the respective wavelength bands and modulated and reflected by the respective liquid crystal panels. The reflected light components from the respective liquid crystal panels are multiplexed by the outgoing PBS 26 and introduced to the projection lens 27, by which they are projected in an enlarged scale to the screen or the like.

In the projector apparatus 40 having such a configuration as described above, since the third liquid crystal panel 25 to which a video signal of green is inputted is disposed at a position at which improvement in contrast can be anticipated most, that is, at a position at which reflected light modulated by the third liquid crystal panel 25 is not reflected by any PBS and does not change its advancing direction between the third liquid crystal panel 25 and the projection lens 27 on the light path of the reflected light and illumination light in the wavelength band of green is introduced to the third liquid crystal panel 25, OFF light is suppressed from being reflected and introduced to the projection lens 27. Consequently, the contrast of the entire projector apparatus 40 is improved.

Further, in the projector apparatus 40, the second liquid crystal panel 21 corresponding to the wavelength band of red is disposed at a position at which improvement in contrast can be anticipated second most. Since light in the wavelength band of red is weakest, the second liquid crystal panel 21 is disposed preferentially to the first liquid crystal panel 20 corresponding to the wavelength band of blue so that the balance among the colors may be maintained.

In this manner, in the projector apparatus 40, since the third liquid crystal panel 25 corresponding to the wavelength band of green which influences most upon the contrast is disposed at a position most advantageous for the contrast, the contrast of the entire system is improved. Further, since the amount of light in the wavelength band of blue from between the remaining wavelength bands of red and blue is greater in the characteristic of the light source, the second liquid crystal panel 21 corresponding to the wavelength band of red is disposed at the second most advantageous position while the first liquid crystal panel 20 corresponding to the wavelength band of blue is disposed next to the second liquid crystal panel 21 corresponding to the wavelength band of red. Therefore, the amount of light in the wavelength band of red can be maintained.

Further, in the projector apparatus 40, since the B band polarizing plate 23 is disposed, OFF light which has been reflected by the reflecting surface 19a of the RB-PBS 19 from within the reflected light from the first liquid crystal panel 20 disposed at the position least advantageous for the contrast can be cut. It is to be noted that, although the B band polarizing plate 23 has an influence also on the wavelength band of green in the polarization characteristic of the polarizing plate, since light in the wavelength band of green is not introduced to the position of the B band polarizing plate 23 but only light components in the wavelength bands of blue and red are introduced to the position of the B band polarizing plate 23, there is no necessity to take such influence upon a different wavelength band into consideration.

As described above, the projector apparatus 40 achieves improvement in contrast of light in the wavelength bands of green and red and achieves improvement in contrast of light also in the wavelength band of blue using a B band polarizing plate, and therefore can project a clear screen image. Further, since the projector apparatus 40 reduces the number of expensive elements such as a G rotating polarizing element or an outgoing polarizing plate used therein when compared with conventional projector apparatus, not only the transmission efficiency is improved, but also reduction of the cost can be anticipated.

Further, in the projector apparatus 40, since the field lens 14 in the projector apparatus 1 is divided into two field lenses including the first field lens 28 and the second field lens 29 disposed rearwardly of the incoming PBS 17 on the light paths, the angle distribution of illumination light incoming to the incoming PBS 17 can be reduced. Further, in the projector apparatus 40, the positions of the first field lens 28 and the second field lens 29 can be adjusted. Therefore, the illumination range by illumination light in each wavelength band can be adjusted.

Since the projector apparatus 40 allows adjustment of the illumination range by illumination light in each wavelength band as just described, the tolerance of the parts can be moderated, and therefore, less expensive parts can be used and reduction of the production cost can be anticipated. Further, since the projector apparatus 40 allows adjustment of the illumination range by illumination light in each wavelength band, the yield in the process of production is improved and the production cost can be reduced.

Figure 4:
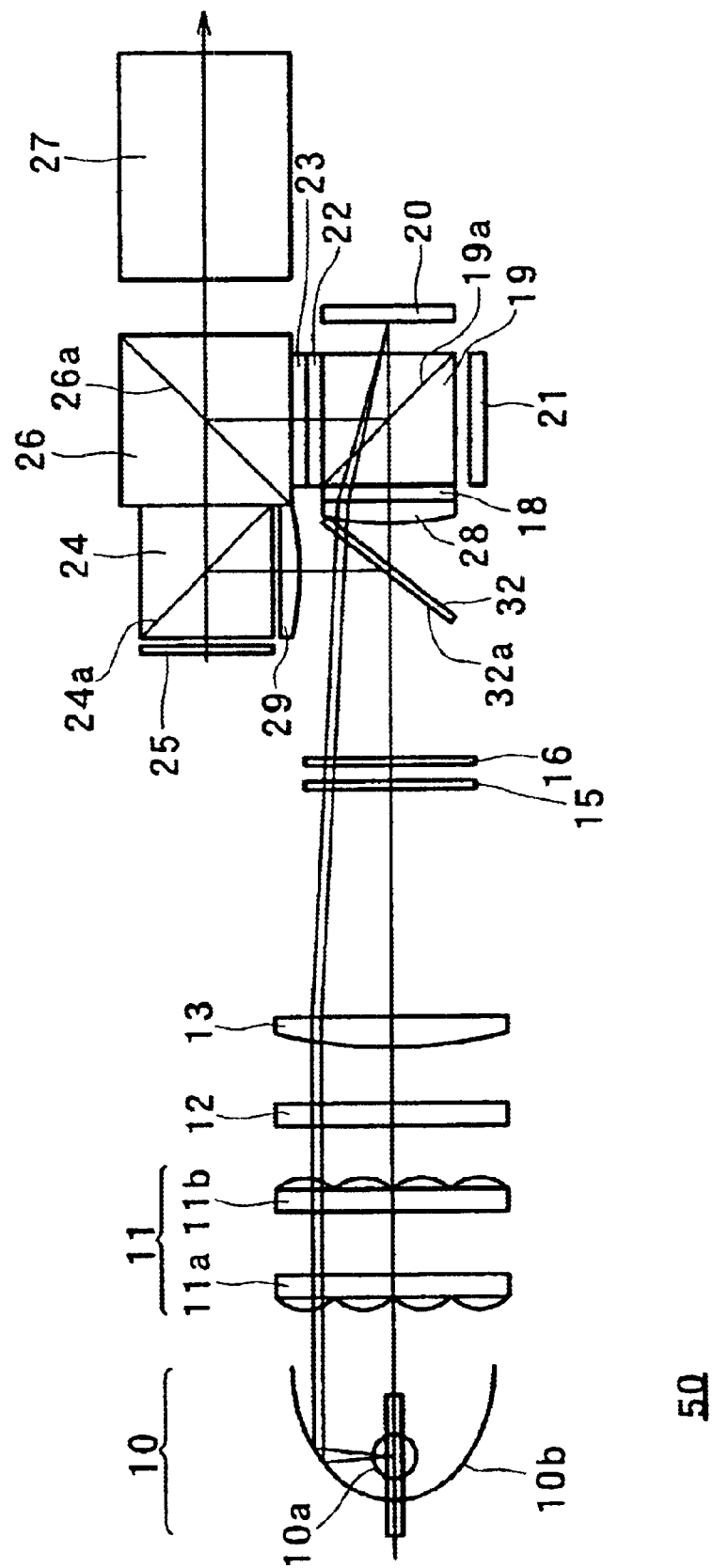
FIG. 4 is a schematic view showing a configuration of a further projector apparatus to which the present invention is applied and wherein an incoming PBS in the form of a flat plate is used.

Referring now to FIG. 4, there is shown a further projector apparatus to which the present invention is applied. The projector apparatus shown is generally denoted by 50 and includes several common components to those of the projector apparatus 1 and 40 described hereinabove with reference to FIGS. 2 and 3, and detailed overlapping description of the common components is omitted herein to avoid redundancy.

The projector apparatus 50 includes a lamp 10 serving as a light source for emitting illumination light, and a fly's eye integrator 11, a PS conversion and multiplexing element 12, a main condenser 13, a pre-polarizing plate 15, a G polarization rotating element 16 and a flat plate PBS 32 disposed in this order along a path of light emitted from the lamp 10.

The flat plate PBS 32 passes therethrough or reflects illumination light having passed through the G polarization rotating element 16 in accordance with polarized light components of the illumination light to demultiplex the polarized light components. The flat plate PBS 32 is in the form of a flat plate formed from, for example, a dielectric multi-player film and passes therethrough, for example, P polarized light while it reflects S polarized light with a reflecting surface 32a thereof, which is inclined by 45° with respect to the light path, to change the advancing direction of the S polarized light by 90°. The flat plate PBS 32 may be an optical element having a polarization-multiplex characteristic and made of a metal in fine grid-like shape.

The flat plate PBS 32 demultiplexes the illumination light having passed through the G polarization rotating element 16 into light which passes through the flat plate PBS 32 and advances straightforwardly and light which is reflected by the reflecting surface 32a and changes the advancing direction thereof by 90°.

The projector apparatus 50 further includes a first field lens 28, a first R polarization rotating element 18 and an RB-PBS 19 disposed in this order along a path of the illumination light having passed through the flat plate PBS 32 and advanced straightforwardly.

The RB-PBS 19 demultiplexes the illumination light having passed through the first R polarization rotating element 18 and reflected light modulated by liquid crystal panels hereinafter described into light which passes through the RB-PBS 19 and advances straightforwardly and light which is reflected by the reflecting surface 19a and changes the advancing direction thereof by 90°.

The projector apparatus 50 further includes a first liquid crystal panel 20 disposed in the advancing direction of the illumination light having passed through the RB-PBS 19 and a second liquid crystal panel 21 disposed in the advancing direction of the illumination light reflected by the reflecting surface 19a of the RB-PBS 19.

The RB-PBS 19 reflects the reflected light modulated by the first liquid crystal panel 20 with the reflecting surface 19a thereof to change the advancing direction of it by 90° while it passes therethrough the reflected light modulated by the second liquid crystal panel 21 so as to advance straightforwardly.

The projector apparatus 50 further includes a second R polarization rotating element 22 and a B band polarizing plate 23 disposed in this order in the advancing direction of the reflected light modulated by the first liquid crystal panel 20 and reflected by the reflecting surface 19a of the RB-PBS 19 and the reflected light modulated by the second liquid crystal panel 21 and having passed through the reflecting surface 19a.

The projector apparatus 50 further includes a second field lens 29 and a G-PBS 24 disposed in this order along a path of the illumination light reflected by the reflecting surface 32a of the flat plate PBS 32.

The G-PBS 24 transmits or reflects the illumination light having passed through the second field lens 29 in accordance with polarized light components of the illumination light.

The G-PBS 24 reflects the illumination light having passed through the second field lens 29 with a reflecting surface 24a thereof to change the advancing direction of it by 90°.

The projector apparatus 50 further includes a third liquid crystal panel 25 disposed in the advancing direction of the illumination light reflected by the reflecting surface 24a of the G-PBS 24.

The G-PBS 24 passes therethrough reflected light modulated by the third liquid crystal panel 25 so as to advance straightforwardly.

The projector apparatus 50 further includes an outgoing PBS 26 disposed in the advancing direction of the reflected light modulated by the first liquid crystal panel 20 and having passed through the B band polarizing plate 23 and the reflected light modulated by the second liquid crystal panel 21 and in the advancing direction of the reflected light modulated by the third liquid crystal panel 25 and having passed through the G-PBS 24.

The outgoing PBS 26 passes or reflects the reflected light modulated by the first liquid crystal panel 20 and having passed through the B band polarizing plate 23, the reflected light modulated by the second liquid crystal panel 21 and the reflected light modulated by the third liquid crystal panel 25 and having passed through the G-PBS 24 to multiplex them in accordance with the polarized light components of them.

The outgoing PBS 26 reflects the reflected light modulated by the first liquid crystal panel 20 and having passed through the B band polarizing plate 23 and the reflected light modulated by the second liquid crystal panel 21 with the reflecting surface 26a thereof to change the advancing direction of them by 90° while it passes therethrough the reflected light modulated by the third liquid crystal panel 25 and having passed through the G-PBS 24 such that it advances straightforwardly so that they may be outputted in the same direction.

The projector apparatus 50 further includes a projection lens 27 disposed in the advancing direction of the reflected light modulated by the first liquid crystal panel 20 and reflected by the reflecting surface 26a of the outgoing PBS 26, the reflected light modulated by the second liquid crystal panel 21 and reflected by the reflecting surface 26a of the outgoing PBS 26, and the reflected light modulated by the third liquid crystal panel 25 and having passed through the outgoing PBS 26.

Operation of the projector apparatus 50 having the configuration described above is described in connection with the components of it disposed along the light path of the illumination light emitted from the lamp 10.

The illumination light emitted from the lamp 10 includes light components in the wavelength bands of red, green and blue of the primary colors of light and is introduced as non-polarized light to the fly's eye integrator 11.

The illumination light introduced to the fly's eye integrator 11 passes through the fly's eye integrator 11, whereupon the illuminance distribution thereof is uniformized by the fly's eye integrator 11. Then, the illumination light is inputted to the PS conversion and multiplexing element 12.

Of the illumination light inputted to the PS conversion and multiplexing element 12, P polarized light passes as it is through the PS conversion and multiplexing element 12 while S polarized light is converted into P polarized light by the PS conversion and multiplexing element 12. Consequently, the illumination light is inputted all as P polarized light to the main condenser 13.

The illumination light inputted to the main condenser 13 is condensed by the main condenser 13 and inputted to the pre-polarizing plate 15.

The pre-polarizing plate 15 adjusts the polarized light components of the illumination light inputted thereto and introduces the resulting light as P polarized light to the G polarization rotating element 16.

Then, the light component only in the wavelength band of green from within the illumination light inputted to the G polarization rotating element 16 is converted into S polarized light with the polarization plane thereof rotated by 90° by the G polarization rotating element 16 and passes through the G polarization rotating element 16 so that it is introduced to the flat plate PBS 32. Meanwhile, the light components of red and blue pass through the G polarization rotating element 16 while they remain P polarized light, and are then introduced to the flat plate PBS 32.

The illumination light introduced to the flat plate PBS 32 includes S polarized light in the wavelength band of green and P polarized light in the wavelength bands of red and blue, and only the P polarized light passes through the reflecting surface 32a of the flat plate PBS 32 and advances straightforwardly while the S polarized light is reflected by the reflecting surface 32a and changes its advancing direction by 90°. In other words, the illumination light in the wavelength bands of red and blue advances straightforwardly within and through the flat plate PBS 32 and is introduced to the first field lens 28 while the illumination light in the wavelength band of green is reflected by the reflecting surface 32a of the flat plate PBS 32 and changes its advancing direction by 90° so that it is introduced to the second field lens 29.

Here, description is given of the light paths of the illumination light in the wavelength bands of red and blue having passed through the flat plate PBS 32 and introduced to the first field lens 28 from within the illumination light demultiplexed by the flat plate PBS 32 described above.

The illumination light introduced to the first field lens 28 is P polarized light in the wavelength bands of red and blue and is introduced to the first R polarization rotating element 18 so that it may be condensed on the first liquid crystal panel 20 and the second liquid crystal panel 21.

The illumination light introduced to the first R polarization rotating element 18 is P polarized light in the wavelength bands of red and blue and the illumination light in the wavelength band of red is converted into S polarized light with the polarization plane thereof rotated by 90° by the first R polarization rotating element 18 and is introduced to the RB-PBS 19.

The illumination light introduced to the RB-PBS 19 includes S polarized light in the wavelength band of red and P polarized light in the wavelength band of blue, and the P polarized light in the wavelength band of blue passes through the reflecting surface 19a of the RB-PBS 19 and is introduced to the first liquid crystal panel 20. Meanwhile, the S polarized light in the wavelength band of red is reflected by the reflecting surface 19a of the RB-PBS 19 and changes its advancing direction by 90° so that it is introduced to the second liquid crystal panel 21.

The illumination light introduced to the first liquid crystal panel 20 is P polarized light in the wavelength band of blue and is modulated and reflected by the first liquid crystal panel 20, on which a pattern based on a video signal of blue is displayed, so that the advancing direction thereof is changed by 180°. Upon such reflection, S polarized light is produced and returned to the RB-PBS 19.

Meanwhile, the illumination light introduced to the second liquid crystal panel 21 is S polarized light in the wavelength band of red and is modulated and reflected by the second liquid crystal panel 21, on which a pattern based on a video signal of red is displayed, so that the advancing direction thereof is changed by 180°. Upon such reflection, P polarized light is produced and returned to the RB-PBS 19.

The reflected light from the first liquid crystal panel 20 returned to the RB-PBS 19 includes S polarized light in the wavelength band of blue and P polarized light which is OFF light, and the P polarized light passes through the reflecting surface 19a of the RB-PBS 19 and is returned to the lamp 10 side while the S polarized light is reflected by the reflecting surface 19a to change the advancing direction thereof by 90° and introduced to the second R polarization rotating element 22. Meanwhile, the reflected light from the second liquid crystal panel 21 returned to the RB-PBS 19 includes P polarized light in the wavelength band of red and S polarized light which is OFF light, and the S polarized light is reflected by the reflecting surface 19a of the RB-PBS 19 and returned to the lamp 10 side while the P polarized light passes through the reflecting surface 19a of the RB-PBS 19 and is introduced to the second R polarization rotating element 22.

The reflected light from the first liquid crystal panel 20 introduced to the second R polarization rotating element 22 is S polarized light in the wavelength band of blue and passes through the second R polarization rotating element 22 so that it is introduced to the B band polarizing plate 23. Meanwhile, the reflected light from the second liquid crystal panel 21 introduced to the second R polarization rotating element 22 is P polarized light in the wavelength band of red and is converted into S polarized light with the polarization plane thereof rotated by 90° by the second R polarization rotating element 22. The resulting S polarized light is introduced to the B band polarizing plate 23.

The reflected light from the first liquid crystal panel 20 introduced to the B band polarizing plate 23 is S polarized light in the wavelength band of blue, and the OFF light having been reflected by a very small amount by the reflecting surface 19a of the RB-PBS 19, that is, P polarized light, is absorbed by the B band polarizing plate 23 while only the S polarized light passes through the B band polarizing plate 23 and is introduced to the outgoing PBS 26. Meanwhile, the reflected light from the second liquid crystal panel 21 introduced to the B band polarizing plate 23 is S polarized light in the wavelength band of red and passes as it is through the B band polarizing plate 23 so that it is introduced to the outgoing PBS 26.

The reflected light from the first liquid crystal panel 20 introduced to the outgoing PBS 26 is S polarized light in the wavelength band of blue and is reflected by the reflecting surface 26a of the outgoing PBS 26 to change the advancing direction thereof by 90° so that it is introduced to the projection lens 27.

Now, description is given of the light path of illumination light in the wavelength band of green reflected by the reflecting surface 32a of the flat plate PBS 32 and introduced to the second field lens 29 from within the illumination light demultiplexed by the flat plate PBS 32 described above.

The illumination light introduced to the second field lens 29 is S polarized light in the wavelength band of green and is introduced to the G-PBS 24 so that it may be condensed on the third liquid crystal panel 25.

The illumination light introduced to the G-PBS 24 is S polarized light in the wavelength band of green and is reflected by the reflecting surface 24a of the G-PBS 24 to change the advancing direction thereof by 90° so that it is introduced to the third liquid crystal panel 25.

The illumination light introduced to the third liquid crystal panel 25 is S polarized light in the wavelength band of green and is modulated and reflected by the third liquid crystal panel 25, on which a pattern based on a video signal of green is displayed, to change the advancing direction thereof by 180°. Upon such reflection, P polarized light is produced and returned to the G-PBS 24.

The reflected light from the third liquid crystal panel 25 returned to the G-PBS 24 includes P polarized light in the wavelength band of green and S polarized light which is OFF light, and the S polarized light is reflected by the reflecting surface 24a to change the advancing direction thereof by 90° so that it is returned to the flat plate PBS 32 while the P polarized light passes through the reflecting surface 24a and is introduced to the outgoing PBS 26.

The reflected light from the third liquid crystal panel 25 introduced to the outgoing PBS 26 is P polarized light in the wavelength band of green and passes through the reflecting surface 26a of the outgoing PBS 26 and then advances straightforwardly so that it is introduced to the projection lens 27.

As described above, the light components in the wavelength bands demultiplexed into the three light paths by the flat plate PBS 32 and the RB-PBS 19 are inputted as illumination light to the liquid crystal panels corresponding to the respective wavelength bands and modulated and reflected by the respective liquid crystal panels. The reflected light components from the respective liquid crystal panels are multiplexed by the outgoing PBS 26 and introduced to the projection lens 27, by which they are projected in an enlarged scale to the screen or the like.

In the projector apparatus 50 having such a configuration as described above, since the third liquid crystal panel 25 to which a video signal of green is inputted is disposed at a position at which improvement in contrast can be anticipated most, that is, at a position at which reflected light modulated by the third liquid crystal panel 25 is not reflected by any PBS and does not change its advancing direction between the third liquid crystal panel 25 and the projection lens 27 on the path of the reflected light and illumination light in the wavelength band of green is introduced to the third liquid crystal panel 25, OFF light is suppressed from being reflected and introduced to the projection lens 27. Consequently, the contrast of the entire projector apparatus 50 is improved.

Further, in the projector apparatus 50, the second liquid crystal panel 21 corresponding to the wavelength band of red is disposed at a position at which improvement in contrast can be anticipated second most. Since light in the wavelength band of red is weakest, the second liquid crystal panel 21 is disposed preferentially to the first liquid crystal panel 20 corresponding to the wavelength band of blue so that the balance among the colors may be maintained.

In this manner, in the projector apparatus 50, since the third liquid crystal panel 25 corresponding to the wavelength band of green which influences most upon the contrast is disposed at a position most advantageous for the contrast, the contrast of the entire system is improved. Further, since the amount of light in the wavelength band of blue from between the remaining wavelength bands of red and blue is greater in the characteristic of the light source, the second liquid crystal panel 21 corresponding to the wavelength band of red is disposed at the second most advantageous position while the first liquid crystal panel 20 corresponding to the wavelength band of blue is disposed next to the second liquid crystal panel 21 corresponding to the wavelength band of red. Therefore, the amount of light in the wavelength band of red can be maintained.

Further, in the projector apparatus 50, since the B band polarizing plate 23 is disposed, OFF light which has been reflected by the reflecting surface 19*a* of the RB-PBS 19 from within the reflected light from the first liquid crystal panel 20 disposed at the position least advantageous for the contrast can be cut. It is to be noted that, although the B band polarizing plate 23 has an influence also on the wavelength band of green in the polarization characteristic of the polarizing plate, since light in the wavelength band of green is not introduced to the position of the B band polarizing plate 23 but only light components in the wavelength bands of blue and red are introduced to the position of the B band polarizing plate 23, there is no necessity to take such influence upon a different wavelength band into consideration.

As described above, the projector apparatus 50 achieves improvement in contrast of light in the wavelength bands of green and red and achieves improvement in contrast of light also in the wavelength band of blue using a B band polarizing plate, and therefore can project a clear screen image. Further, since the projector apparatus 50 reduces the number of expensive elements such as a G rotating polarizing element or an outgoing polarizing plate used therein when compared with conventional projector apparatus, not only the transmission efficiency is improved, but also reduction of the cost can be anticipated.

Further, in the projector apparatus 50, since the field lens 14 in the projector apparatus 1 is divided into two field lenses including the first field lens 28 and the second field lens 29 disposed rearwardly of the flat plate PBS 32 on the light paths, the angle distribution of illumination light incoming to the flat plate PBS 32 can be reduced. Further, in the projector apparatus 50, the positions of the first field lens 28 and the second field lens 29 can be adjusted. Consequently, the illumination range by illumination light in each wavelength band can be adjusted.

Since the projector apparatus 50 allows adjustment of the illumination range by illumination light in each wavelength band as just described, the tolerance of the parts can be moderated, and therefore, less expensive parts can be used and the production cost can be reduced. Further, since the projector apparatus 50 allows adjustment of the illumination range by illumination light in each wavelength band, the yield in the process of production is improved and the production cost can be reduced.

Further, although, where an optical element in the form of a flat plate is used in an optical system, normally the astigmatism must be taken into consideration, with the projector apparatus 50, there is no necessity to take the astigmatism into consideration because the flat plate PBS 32 is disposed in the illumination optical system. Consequently, the projector apparatus 50 can use a less expensive PBS in the form of a flat plate without using an expensive glass material, and not only the cost of the entire apparatus can be reduced but also the weight of the entire apparatus can be reduced.

It is to be noted that the projector apparatus 50 shown in FIG. 4 is configured such that the optical elements are adhered to each other such that the air gap between each adjacent ones of the optical elements is eliminated. In the projector apparatus 50, several optical devices are sandwiched between and adhered to the RB-PBS 19, G-PBS 24 and the outgoing PBS 26. It is to be noted that, in the projector apparatus 50 described above, a Fresnel lens can be used for the first field lens 28 and the second field lens 29, and since the Fresnel lens has a flattened configuration, it can be adhered to another optical element.

As described above, with the projector apparatus 50, since the optical elements are adhered to each other to form them as a unitary member, miniaturization of the entire apparatus can be achieved and the material cost can be reduced. Further, with the projector apparatus 50, since the optical elements are adhered to each other to fix them, pixel displacement between the liquid crystal panels can be prevented.

Figure 5:
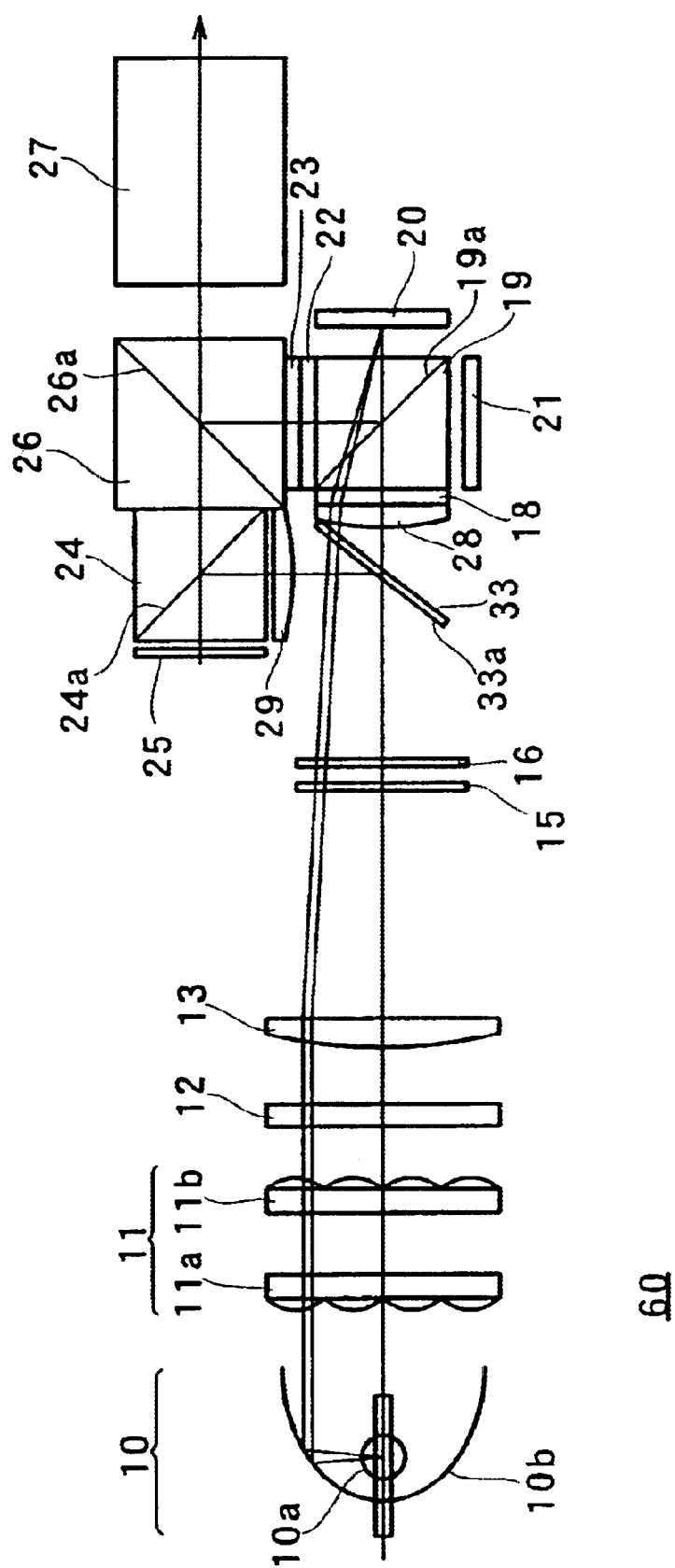
FIG. 5 is a schematic view showing a configuration of a still further projector apparatus to which the present invention is applied and wherein a dichroic mirror is used.

Referring now to FIG. 5, there is shown a still further projector apparatus to which the present invention is applied The projector apparatus shown is generally denoted by 60 and includes several common components to those of the projector apparatus 1, 40 and 50 described hereinabove with reference to FIGS. 2, 3 and 4, and detailed overlapping description of the common components is omitted herein to avoid redundancy.

The projector apparatus 60 includes a lamp 10 serving as a light source for emitting illumination light, and a fly's eye integrator 11, a PS conversion and multiplexing element 12, a main condenser 13, a pre-polarizing plate 15, a G polarization rotating element 16 and a G reflection dichroic mirror 33 disposed along a path of light emitted from the lamp 10.

The G reflection dichroic mirror 33 passes or reflects illumination light having passed through the G polarization rotating element 16 in accordance with polarized light components of the illumination light to demultiplex the polarized light components. The G reflection dichroic mirror 33 is in the form of a flat plate formed from, for example, a plurality of thin films layered one on another and passes therethrough, for example, the illumination light in the wavelength bands other than the wavelength band of green, that is, the illumination light in the wavelength bands of red and blue, while it reflects the illumination light in the wavelength band of green with a reflecting surface 33*a* thereof, which is inclined by 45° with respect to the light path, to change the advancing direction of the illumination light by 90°.

The G reflection dichroic mirror 33 demultiplexes the illumination light having passed through the G polarization rotating element 16 into light which passes through the G reflection dichroic mirror 33 and advances straightforwardly and light which is reflected by the reflecting surface 33*a* and changes the advancing direction thereof by 90°.

The projector apparatus 60 further includes a first field lens 28, a first R polarization rotating element 18 and an RB-PBS 19 arranged in this order along a path of the illumination light having passed through the G reflection dichroic mirror 33 and advancing straightforwardly.

The RB-PBS 19 demultiplexes the illumination light having passed through the first R polarization rotating element 18 and reflected light from liquid crystal panels hereinafter described into light which passes through the RB-PBS 19 and advances straightforwardly and light which is reflected by the reflecting surface 19*a* and changes the advancing direction thereof by 90°.

The projector apparatus 60 further includes a first liquid crystal panel 20 disposed in the advancing direction of the illumination light having passed through the RB-PBS 19 and a second liquid crystal panel 21 disposed in the advancing direction of the illumination light reflected by the reflecting surface 19a of the RB-PBS 19.

The RB-PBS 19 reflects the reflected light modulated by the first liquid crystal panel 20 with the reflecting surface 19a thereof to change the advancing direction of it by 90° while it passes therethrough the reflected light modulated by the second liquid crystal panel 21 so as to advance straightforwardly.

The projector apparatus 60 further includes a second R polarization rotating element 22 and a B band polarizing plate 23 disposed in this order in the advancing direction of the reflected light modulated by the first liquid crystal panel 20 and reflected by the reflecting surface 19a of the RB-PBS 19 and the reflected light modulated by the second liquid crystal panel 21 and having passed through the reflecting surface 19a.

The projector apparatus 60 further includes a second field lens 29 and a G-PBS 24 disposed in this order along a path of the illumination light reflected by the reflecting surface 33a of the G reflection dichroic mirror 33.

The G-PBS 24 transmits or reflects the illumination light having passed through the second field lens 29 in accordance with polarized light components of it.

The G-PBS 24 reflects the illumination light having passed through the second field lens 29 with a reflecting surface 24a thereof to change the advancing direction of it by 90°.

The projector apparatus 60 further includes a third liquid crystal panel 25 disposed in the advancing direction of the illumination light reflected by the reflecting surface 24a of the G-PBS 24.

The G-PBS 24 passes therethrough reflected light modulated by the third liquid crystal panel 25 so as to advance straightforwardly.

The projector apparatus 60 further includes an outgoing PBS 26 disposed in the advancing direction of the reflected light modulated by the first liquid crystal panel 20 and having passed through the B band polarizing plate 23 and the reflected light modulated by the second liquid crystal panel 21 and in the advancing direction of the reflected light modulated by the third liquid crystal panel 25 and having passed through the G-PBS 24.

The outgoing PBS 26 reflects the reflected light modulated by the first liquid crystal panel 20 and having passed through the B band polarizing plate 23 and the reflected light modulated by the second liquid crystal panel 21 with the reflecting surface 26a thereof to change the advancing direction of them by 90° while it passes therethrough the reflected light modulated by the third liquid crystal panel 25 and having passed through the G-PBS 24 such that it advances straightforwardly so that they may be outputted in the same direction.

The projector apparatus 60 further includes a projection lens 27 disposed in the advancing direction of the reflected light modulated by the first liquid crystal panel 20 and reflected by the reflecting surface 26a of the outgoing PBS 26, the reflected light modulated by the second liquid crystal panel 21 and reflected by the reflecting surface 26a of the outgoing PBS 26, and the reflected light modulated by the third liquid crystal panel 25 and having passed through the outgoing PBS 26.

Operation of the projector apparatus 60 having the configuration described above is described in connection with the components of it disposed along the light path of the illumination light emitted from the lamp 10.

The illumination light emitted from the lamp 10 includes light components of the wavelength bands of red, green and blue of the primary colors of light and is introduced as non-polarized light to the fly's eye integrator 11.

The illumination light introduced to the fly's eye integrator 11 passes through the fly's eye integrator 11, whereupon the illuminance distribution thereof is uniformized by the fly's eye integrator 11. Then, the illumination light is inputted to the PS conversion and multiplexing element 12.

Of the illumination light inputted to the PS conversion and multiplexing element 12, P polarized light passes as it is through the PS conversion and multiplexing element 12 while S polarized light is converted into P polarized light by the PS conversion and multiplexing element 12. Consequently, the illumination light is inputted all as P polarized light to the main condenser 13.

The illumination light inputted to the main condenser 13 is condensed by the main condenser 13 and inputted to the pre-polarizing plate 15.

The pre-polarizing plate 15 adjusts the polarized light components of the illumination light inputted thereto and introduces the resulting light as P polarized light to the G polarization rotating element 16.

Then, the light component only in the wavelength band of green from within the illumination light inputted to the G polarization rotating element 16 is converted into S polarized light with the polarization plane thereof rotated by 90° by the G polarization rotating element 16 and passes through the G polarization rotating element 16 so that it is introduced to the G reflection dichroic mirror 33. Meanwhile, the light components of red and blue pass through the G polarization rotating element 16 while they remain P polarized light, and are then introduced to the G reflection dichroic mirror 33.

The illumination light introduced to the G reflection dichroic mirror 33 includes S polarized light in the wavelength band of green and P polarized light in the wavelength bands of red and blue, and only the illumination light in the wavelength bands of red and blue passes through the G reflection dichroic mirror 33 and advances straightforwardly so that it is introduced to the first field lens 28. Meanwhile, the illumination light in the wavelength band of green is reflected by the reflecting surface 33a of the G reflection dichroic mirror 33 and changes its advancing direction by 90° so that it is introduced to the second field lens 29.

Here, description is given of the light paths of the illumination light in the wavelength bands of red and blue having passed through the G reflection dichroic mirror 33 and introduced to the first field lens 28 from within the illumination light demultiplexed in accordance with the wavelength bands by the G reflection dichroic mirror 33 described above.

The illumination light introduced to the first field lens 28 is P polarized light in the wavelength bands of red and blue and is introduced to the first R polarization rotating element 18 so that it may be condensed on the first liquid crystal panel 20 and the second liquid crystal panel 21.

The illumination light introduced to the first R polarization rotating element 18 is P polarized light in the wavelength bands of red and blue, and the illumination light in the wavelength band of red is converted into S polarized light with the polarization plane thereof rotated by 90° by the first R polarization rotating element 18 and is introduced to the RB-PBS 19.

The illumination light introduced to the RB-PBS 19 includes S polarized light in the wavelength band of red and P polarized light in the wavelength band of blue, and the P polarized light in the wavelength band of blue passes through the reflecting surface 19a of the RB-PBS 19 and is introduced to the first liquid crystal panel 20. Meanwhile, the S polarized light in the wavelength band of red is reflected by the reflecting surface 19a of the RB-PBS 19 and changes its advancing direction by 90° so that it is introduced to the second liquid crystal panel 21.

The illumination light introduced to the first liquid crystal panel 20 is P polarized light in the wavelength band of blue and is modulated and reflected by the first liquid crystal panel 20, on which a pattern based on a video signal of blue is displayed, so that the advancing direction thereof is changed by 180°. Upon such reflection, S polarized light is produced and returned to the RB-PBS 19.

Meanwhile, the illumination light introduced to the second liquid crystal panel 21 is S polarized light in the wavelength band of red and is modulated and reflected by the second liquid crystal panel 21, on which a pattern based on a video signal of red is displayed, so that the advancing direction thereof is changed by 180°. Upon such reflection, P polarized light is produced and returned to the RB-PBS 19.

The reflected light from the first liquid crystal panel 20 returned to the RB-PBS 19 includes S polarized light in the wavelength band of blue and P polarized light which is OFF light, and the P polarized light passes through the reflecting surface 19a of the RB-PBS 19 and is returned to the lamp 10 side while the S polarized light is reflected by the reflecting surface 19a to change the advancing direction thereof by 90° and introduced to the second R polarization rotating element 22. Meanwhile, the reflected light from the second liquid crystal panel 21 returned to the RB-PBS 19 includes P polarized light in the wavelength band of red and S polarized light which is OFF light, and the S polarized light is reflected by the reflecting surface 19a of the RB-PBS 19 and returned to the lamp 10 side while the P polarized light passes through the reflecting surface 19a of the RB-PBS 19 and is introduced to the second R polarization rotating element 22.

The reflected light from the first liquid crystal panel 20 introduced to the second R polarization rotating element 22 is S polarized light in the wavelength band of blue and passes through the second R polarization rotating element 22 so that it is introduced to the B band polarizing plate 23. Meanwhile, the reflected light from the second liquid crystal panel 21 introduced to the second R polarization rotating element 22 is P polarized light in the wavelength band of red and is converted into S polarized light with the polarization plane thereof rotated by 90° by the second R polarization rotating element 22. The resulting S polarized light is introduced to the B band polarizing plate 23.

The reflected light from the first liquid crystal panel 20 introduced to the B band polarizing plate 23 is S polarized light in the wavelength band of blue, and the OFF light having been reflected by a very small amount by the reflecting surface 19a of the RB-PBS 19, that is, P polarized light, is absorbed by the B band polarizing plate 23 while only the S polarized light passes through the B band polarizing plate 23 and is introduced to the outgoing PBS 26. Meanwhile, the reflected light from the second liquid crystal panel 21 introduced to the B band polarizing plate 23 is S polarized light in the wavelength band of red and passes as it is through the B band polarizing plate 23 so that it is introduced to the outgoing PBS 26.

The reflected light from the first liquid crystal panel 20 introduced to the outgoing PBS 26 is S polarized light in the wavelength band of blue and is reflected by the reflecting surface 26a of the outgoing PBS 26 to change the advancing direction thereof by 90° so that it is introduced to the projection lens 27.

Now, description is given of the light path of illumination light in the wavelength band of green reflected by the reflecting surface 33a of the G reflection dichroic mirror 33 and introduced to the second field lens 29 from within the illumination light demultiplexed by the G reflection dichroic mirror 33 described hereinabove.

The illumination light introduced to the second field lens 29 is S polarized light in the wavelength band of green and is introduced to the G-PBS 24 so that it may be condensed on the third liquid crystal panel 25.

The illumination light introduced to the G-PBS 24 is S polarized light in the wavelength band of green and is reflected by the reflecting surface 24a of the G-PBS 24 to change the advancing direction thereof by 90° so that it is introduced to the third liquid crystal panel 25.

The illumination light introduced to the third liquid crystal panel 25 is S polarized light in the wavelength band of green and is modulated and reflected by the third liquid crystal panel 25, on which a pattern based on a video signal of green is displayed, to change the advancing direction thereof by 180°. Upon such reflection, P polarized light is produced and returned to the G-PBS 24.

The reflected light from the third liquid crystal panel 25 returned to the G-PBS 24 includes P polarized light in the wavelength band of green and S polarized light which is OFF light, and the S polarized light is reflected by the reflecting surface 24a to change the advancing direction thereof by 90° so that it is returned to the G reflection dichroic mirror 33 while the P polarized light passes through the reflecting surface 24a and is introduced to the outgoing PBS 26.

The reflected light from the third liquid crystal panel 25 introduced to the outgoing PBS 26 is P polarized light in the wavelength band of green and passes through the reflecting surface 26a of the outgoing PBS 26 and then advances straightforwardly so that it is introduced to the projection lens 27.

As described above, the light components in the wavelength bands demultiplexed into the three light paths by the G reflection dichroic mirror 33 and the RB-PBS 19 are inputted as illumination light to the liquid crystal panels corresponding to the respective wavelength bands and modulated and reflected by the respective liquid crystal panels. The reflected light components from the respective liquid crystal panels are multiplexed by the outgoing PBS 26 and introduced to the projection lens 27, by which they are projected in an enlarged scale to the screen or the like.

In the projector apparatus 60 having such a configuration as described above, since the third liquid crystal panel 25 to which a video signal of green is inputted is disposed at a position at which improvement in contrast can be anticipated most, that is, at a position at which reflected light modulated by the third liquid crystal panel 25 is not reflected by any PBS and does not change its advancing direction between the third liquid crystal panel 25 and the projection lens 27 on the light path of the reflected light and illumination light in the wavelength band of green is introduced to the third liquid crystal panel 25, OFF light is suppressed from being reflected and introduced to the projection lens 27. Consequently, the contrast of the entire projector apparatus 60 is improved.

Further, in the projector apparatus 60, the second liquid crystal panel 21 corresponding to the wavelength band of red is disposed at a position at which improvement in contrast can be anticipated second most. Since light in the wavelength band of red is weakest, the second liquid crystal panel 21 is disposed preferentially to the first liquid crystal panel 20 corresponding to the wavelength band of blue so that the balance among the colors may be maintained.

In this manner, in the projector apparatus 60, since the third liquid crystal panel 25 corresponding to the wavelength band of green which influences most upon the contrast is disposed at a position most advantageous for the contrast, the contrast of the entire system is improved. Further, since the amount of light in the wavelength band of blue from between the remaining wavelength bands of red and blue is greater in the characteristic of the light source, the second liquid crystal panel 21 corresponding to the wavelength band of red is disposed at the second most advantageous position while the first liquid crystal panel 20 corresponding to the wavelength band of blue is disposed next to the second liquid crystal panel 21 corresponding to the wavelength band of red. Therefore, the amount of light in the wavelength band of red can be maintained.

Further, in the projector apparatus 60, since the B band polarizing plate 23 is disposed, OFF light which has been reflected by the reflecting surface 19a of the RB-PBS 19 from within the reflected light from the first liquid crystal panel 20 disposed at the position least advantageous for the contrast can be cut. It is to be noted that, although the B band polarizing plate 23 has an influence also on the wavelength band of green in the polarization characteristic of the polarizing plate, since light in the wavelength band of green is not introduced to the position of the B band polarizing plate 23 but only light components in the wavelength bands of blue and red are introduced to the position of the B band polarizing plate 23, there is no necessity to take such influence upon a different wavelength band into consideration.

As described above, the projector apparatus 60 achieves improvement in contrast of light in the wavelength bands of green and red and achieves improvement in contrast of light also in the wavelength band of blue using a B band polarizing plate, and therefore can project a clear screen image. Further, since the projector apparatus 60 reduces the number of expensive elements such as a G rotating polarizing element or an emerging polarizing plate used therein when compared with conventional projector apparatus, not only the transmission efficiency is improved, but also reduction of the cost can be anticipated.

Further, in the projector apparatus 60, since the field lens 14 in the projector apparatus 1 is divided into two field lenses including the first field lens 28 and the second field lens 29 disposed rearwardly of the G reflection dichroic mirror 33 on the light paths, the angle distribution of illumination light incoming to the G reflection dichroic mirror 33 can be reduced. Further, in the projector apparatus 60, the positions of the first field lens 28 and the second field lens 29 can be adjusted. Consequently, the illumination range by illumination light in each wavelength band can be adjusted.

Since the projector apparatus 60 allows adjustment of the illumination range by illumination light in each wavelength band as just described, the tolerance of the parts can be moderated, and therefore, less expensive parts can be used and the production cost can be reduced. Further, since the projector apparatus 60 allows adjustment of the illumination range by illumination light in each wavelength band, the yield in the process of production is improved and the production cost can be reduced.

Further, although, where an optical element in the form of a flat plate is used in an optical system, normally the astigmatism must be taken into consideration, with the projector apparatus 60, there is no necessity to take the astigmatism into consideration because the G reflection dichroic mirror 33 is disposed in the illumination optical system. Consequently, the projector apparatus 60 can use a less expensive optical element without using an expensive glass material, and not only the cost of the entire apparatus can be reduced but also the weight of the entire apparatus can be reduced. Further, since the dichroic mirror is less expensive than the PBS, further reduction of the cost can be anticipated with the projector apparatus 60.

It is to be noted that the projector apparatus 60 shown in FIG. 5 is configured such that the optical elements are adhered to each other in such a manner that the air gap between each adjacent ones of the optical elements is eliminated. In the projector apparatus 60, several optical devices are sandwiched between and adhered to the RB-PBS 19, G-PBS 24 and the outgoing PBS 26. It is to be noted that, in the projector apparatus 60 described above, a Fresnel lens can be used for the first field lens 28 and the second field lens 29, and since the Fresnel lens has a flattened configuration, it can be adhered to another optical element.

As described above, with the projector apparatus 60, since the optical elements are adhered to each other to form them as a unitary member, miniaturization of the entire apparatus can be achieved and the material cost can be reduced. Further, with the projector apparatus 60, since the optical elements are adhered to each other to fix them, pixel displacement between the liquid crystal panels can be prevented.

It is to be noted that, while it is described in the foregoing description that a liquid crystal panel is used as an optical modulation element, the optical modulation is not limited to this, but an optical modulation element of any type can be used if it spatially modulate the polarization state of light.

While preferred embodiments of the present invention have been described using specific terms, such description is for illustrative purposes only, and it is to be understood that changes and variations may be made without departing from the spirit or scope of the following claims.

What is claimed is:

1. A projection apparatus, comprising:

a light source for emitting illumination light;

a condensing lens for condensing the illumination light emitted from said light source;

a first polarizing plate for adjusting polarized light components of the illumination light having passed through said condensing lens;

a first polarization rotating element for rotating the polarization plane of the illumination light in the wavelength band of green from within the illumination light whose polarized light components have been adjusted by said first polarizing plate;

demultiplexing means for reflecting the illumination light in the wavelength band of green whose polarization plane has been rotated by said first polarization rotating element and passing the illumination light in wavelength bands of red and blue therethrough;

a second polarization rotating element for rotating the polarization plane of the illumination light in a first one of the wavelength bands of red and blue from within the illumination light having passed through said demultiplexing means and passing the illumination light in a second one of the wavelength bands of red and blue therethrough;

a first optical modulation element for modulating and reflecting the illumination light in the second wavelength band having passed through said second polarization rotating element;

a second optical modulation element for modulating and reflecting the illumination light in the first wavelength band whose polarization plane has been rotated by said second polarization rotating element;

a third optical modulation element for modulating and reflecting the illumination light in the wavelength band of green reflected by said demultiplexing means;

a first polarization beam splitter interposed between said second polarization rotating element and said first and second optical modulation elements for passing the illumination light in the second wavelength band having passed through said second polarization rotating element so as to be introduced to said first optical modulation element and reflecting the illumination light in the first wavelength band whose polarization plane has been rotated by said second polarization rotating element so as to be introduced to said second optical modulation element and for reflecting the modulated and reflected light in the second wavelength band from said first optical modulation element and passing the modulated and reflected light in the first wavelength band from said second optical modulation element therethrough;

a third polarization rotating element for passing the reflected light in the second wavelength band reflected by said first polarization beam splitter therethrough and rotating the polarization plane of the reflected light in the first wavelength band having passed through said first polarization beam splitter;

a second polarization beam splitter interposed between said demultiplexing means and said third optical modulation element for reflecting the illumination light in the wavelength band of green reflected by said demultiplexing means so as to be introduced to said third optical modulation element and passing the modulated reflected light in the wavelength band of green from said third optical modulation element therethrough;

a third polarization beam splitter for reflecting the reflected light in the second wavelength band having passed through said third polarization rotating element, reflecting the reflected light in the first wavelength band whose polarization plane has been rotated by said third polarization rotating element and passing the reflected light in the wavelength band of green having passed through said second polarization beam splitter therethrough; and a projection lens for projecting the reflected light in the first wavelength band reflected by said third polarization beam splitter, the reflected light in the second wavelength band reflected by said third polarization beam splitter and the reflected light in the wavelength band of green having passed through said third polarization beam splitter so as to form a screen image of an enlarged scale.

2. A projection apparatus according to claim 1, wherein said second polarization rotating element passes the illumination light in the wavelength band of blue from within the illumination light having passed through said demultiplexing means therethrough and rotates the polarization plane of the illumination light in the wavelength band of red from within the illumination light having passed through said demultiplexing means, and said first polarization beam splitter passes the illumination light in the wavelength band of blue having passed through said second polarization rotating element therethrough so as to be introduced to said first optical modulation element and reflects the illumination light in the wavelength band of red whose polarization plane has been rotated by said second polarization rotating element so as to be introduced to said second optical modulation element whereas said third polarization rotating element passes the reflected light in the wavelength band of blue therethrough and rotates the polarization plane of the reflected light in the wavelength band of red.

3. A projection apparatus according to claim 2, further comprising a second polarizing plate interposed between said first polarization beam splitter and said second polarization beam splitter for intercepting the reflected light in the wavelength band of blue from said first optical modulation element in accordance with the polarized light component and passing the reflected light in the wavelength band of red from said second optical modulation element therethrough.

4. A projection apparatus according to claim 1, wherein said demultiplexing means passes therethrough or reflects the illumination light in accordance with the polarized light component.

5. A projection apparatus according to claim 4, wherein said demultiplexing means is formed as a flat plate.

6. A projection apparatus according to claim 5, wherein said demultiplexing means includes an optical element made of a metal which demultiplexes the illumination light in accordance with the polarized light components and formed in fine grid-like shape on a substrate.

7. A projection apparatus according to claim 1, wherein said demultiplexing means passes therethrough or reflects the illumination light in accordance with the wavelength bands.

8. A projection apparatus according to claim 7, wherein said demultiplexing means is formed as a flat plate.

9. A projection apparatus according to claim 8, wherein said demultiplexing means is formed from a dichroic mirror.

10. A projection apparatus according to claim 1, further comprising a polarization conversion element interposed between said light source and said condensing lens for passing the illumination light emitted from said light source therethrough with the polarized light components of the illumination light adjusted to each other.

11. A projection apparatus according to claim 1, further comprising a fly-eye integrator interposed between said light source and said condensing lens for uniformizing the illuminance distribution of the illumination light emitted from said light source.

12. A projection apparatus according to claim 1, wherein said condensing lens includes a main lens and a field lens.

13. A projection apparatus according to claim 12, wherein said field lens includes a first field lens interposed between said demultiplexing means and said first polarization beam splitter and a second field lens interposed between said demultiplexing means and said second polarization beam splitter.

14. A projection apparatus according to claim 1, wherein said first polarization beam splitter and said third polarization beam splitter are adhered to each other with said third polarization rotating element interposed therebetween, and said second polarization beam splitter and said third polarization beam splitter are adhered to each other.

15. A projection apparatus according to claim 3, wherein said first polarization beam splitter and said third polarization beam splitter are adhered to each other with said third polarization rotating element and said second polarizing plate interposed therebetween, and said first polarization beam splitter and said third polarization beam splitter are adhered to each other.

16. A projection apparatus according to claim 13, wherein each of said first field lens and said second field lens is a Fresnel lens.

17. A projection apparatus according to claim 16, wherein said demultiplexing means and said first polarization beam splitter are adhered to each other with said first field lens and said second polarization rotating element interposed therebetween and said demultiplexing means and said second polarization beam splitter are adhered to each other with said second field lens interposed therebetween while said first polarization beam splitter and said third polarization beam splitter are adhered to each other with said third polarization rotating element interposed therebetween and said first polarization beam splitter and said third polarization beam splitter are adhered to each other.

* * * * *